(12) United States Patent
Ikedo

(10) Patent No.: US 6,538,765 B1
(45) Date of Patent: Mar. 25, 2003

(54) OUTPUT IMAGE DATA GENERATION MEMORY MEDIUM, DEVICE AND PRINTER

(75) Inventor: Tatsuhiro Ikedo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/386,371

(22) Filed: Aug. 31, 1999

(30) Foreign Application Priority Data

Aug. 31, 1998 (JP) ............................................ 10-245386

(51) Int. Cl.⁷ ............................................... G06F 12/00
(52) U.S. Cl. ..................... 358/1.16; 358/1.18; 707/500; 707/517; 707/520; 707/523
(58) Field of Search ............................. 358/1.16, 1.18; 707/500, 517, 520, 523

(56) References Cited

U.S. PATENT DOCUMENTS

| | | |
|---|---|---|
| 4,718,784 A | 1/1988 | Drisko |
| 5,214,755 A | 5/1993 | Mason |
| 5,538,352 A | 7/1996 | Sugiura |
| 5,930,811 A * | 7/1999 | Nojima et al. ............... 707/517 |
| 6,327,387 B1 * | 12/2001 | Naoi et al. .................. 382/173 |

FOREIGN PATENT DOCUMENTS

| | | |
|---|---|---|
| EP | 0 431 638 A2 | 6/1991 |
| JP | 7-89196 | 4/1995 |

* cited by examiner

Primary Examiner—Edward Coles
Assistant Examiner—Alan Rahimi
(74) Attorney, Agent, or Firm—Oliff & Berridge, PLC

(57) ABSTRACT

An improvement in the technique to create output image includes creating on output template data by automatically replacing template character train data, which is created based on an output format, with data that is inputted by an operator and has the same identification as the template data. The created output data is the same as it is inputted by an operator based on the format. As the data, which is inputted without regard to the format, can be used for creating output image data with this method, an operator does not need to input data based on a predetermined format, thereby reducing an operator's burden.

17 Claims, 33 Drawing Sheets

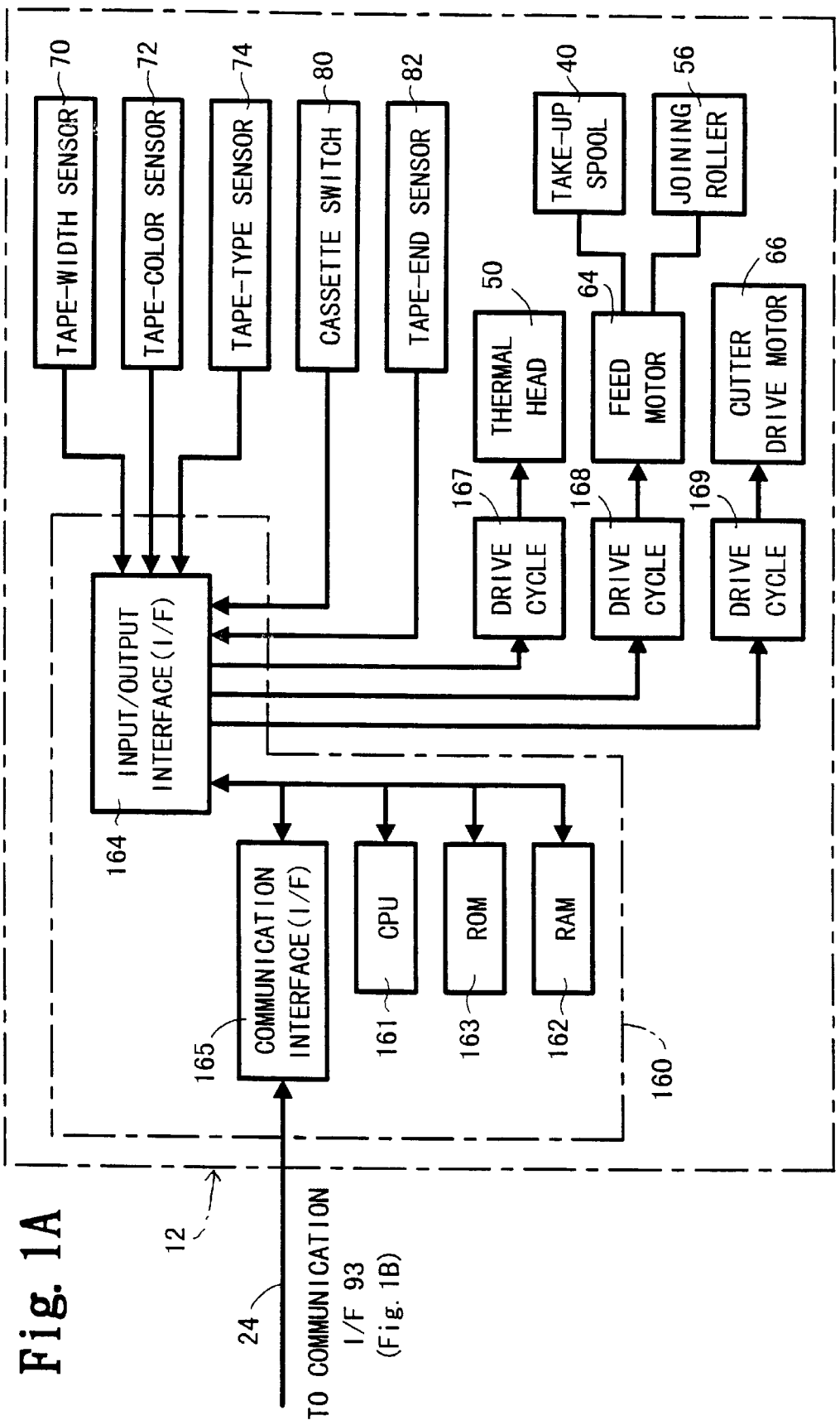

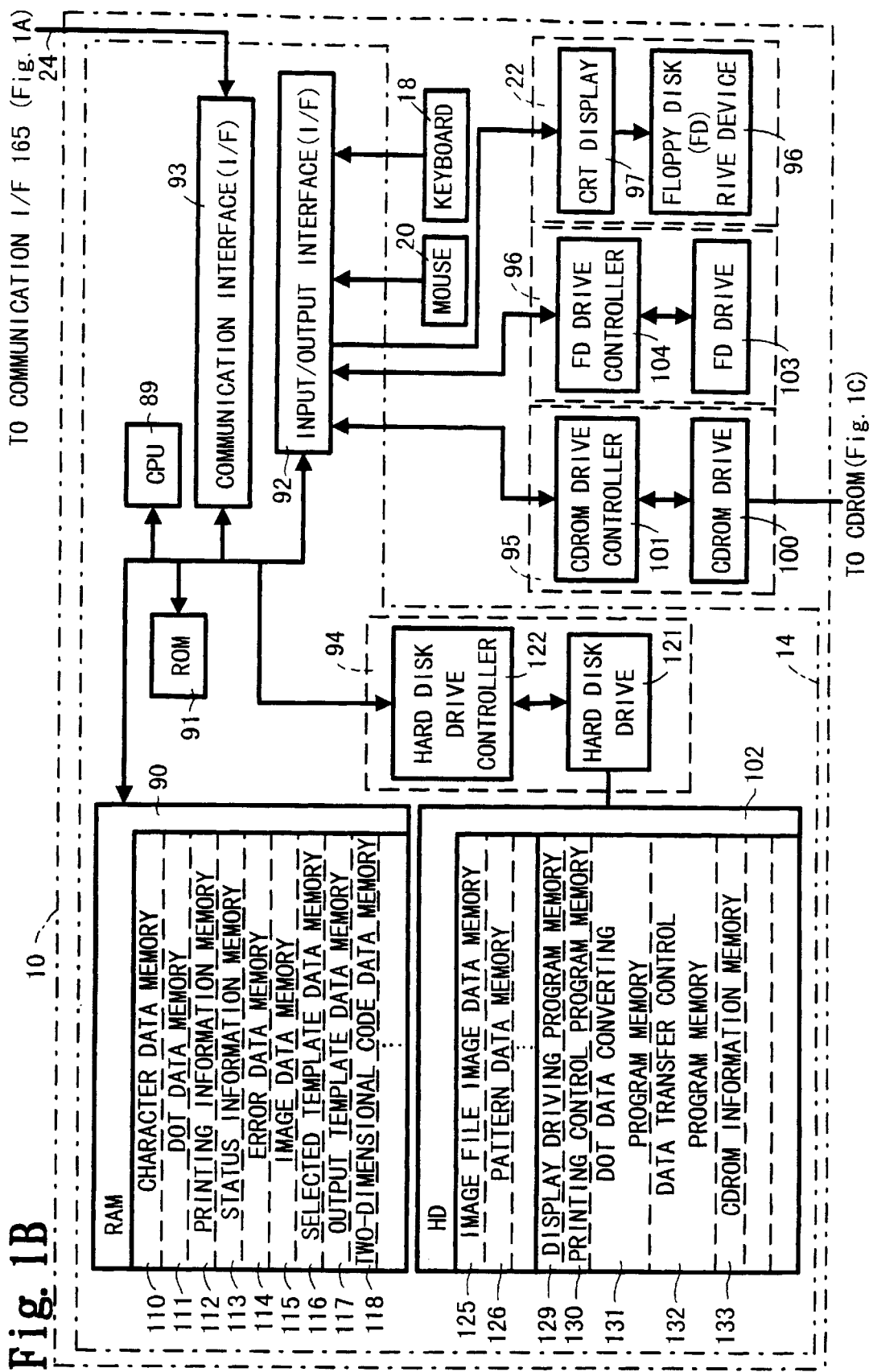

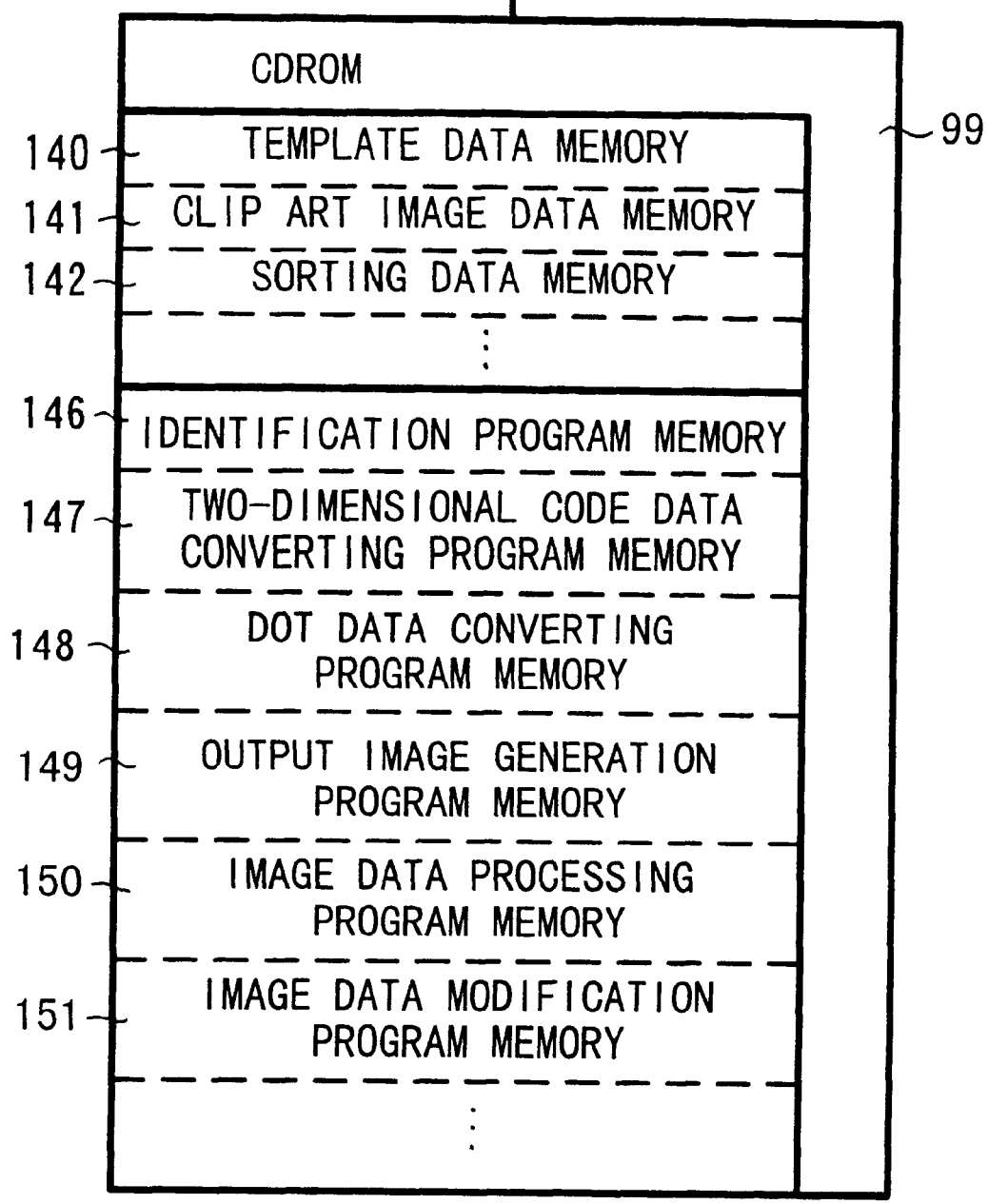

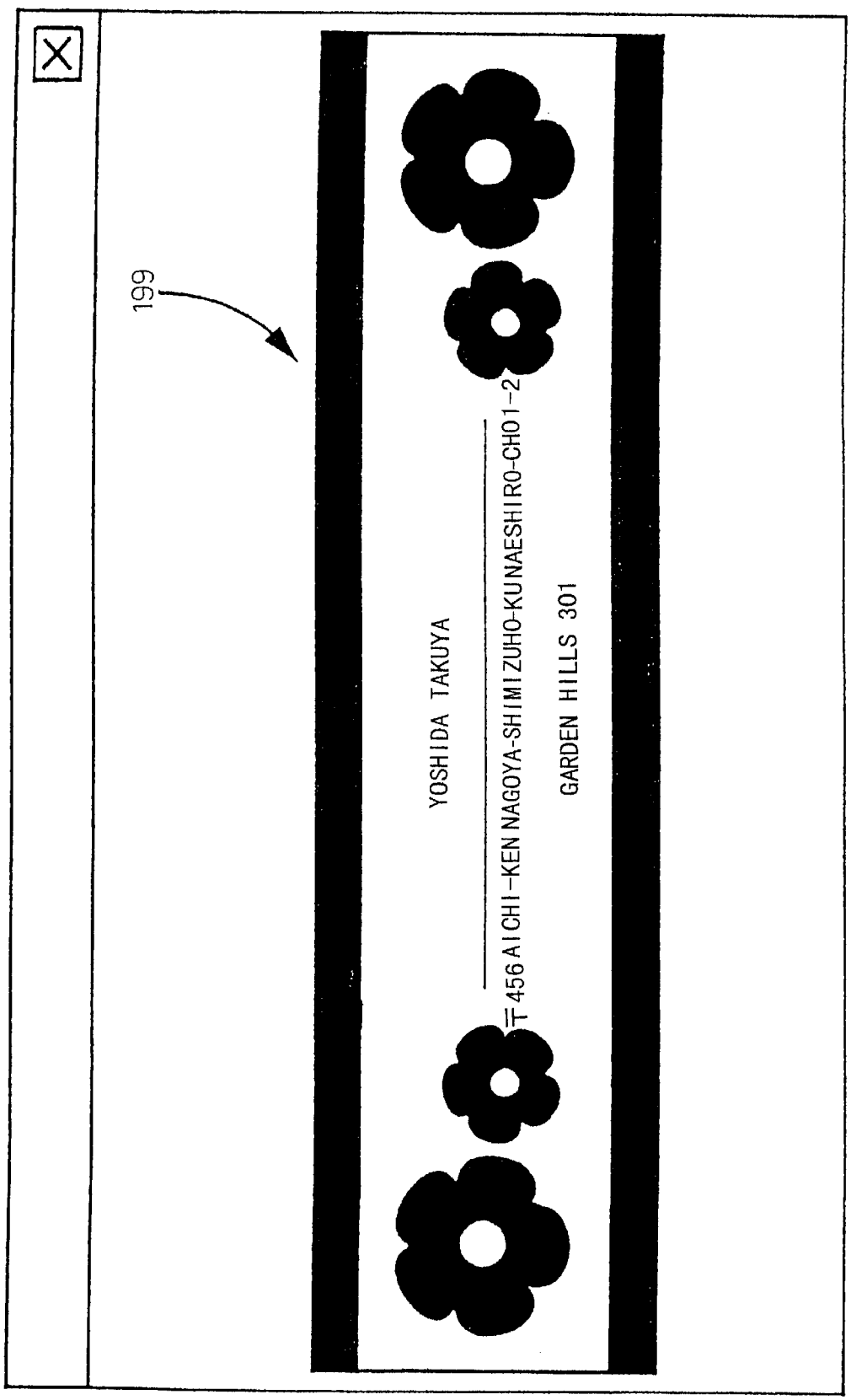

Fig. 11

| KEY CHARACTER | SORTING DATA |
|---|---|
| ・・TO | ADMINISTRATIVE DISTRICT SORTING DATA A (TOKYO-TO) |
| ・・FU, ・・KEN, ・・DOU | ADMINISTRATIVE DISTRICT SORTING DATA B (FU. KEN. DOU) |
| ・・SHI, ・・GUN | ADMINISTRATIVE DISTRICT SORTING DATA C (SHI. GUN) |
| ・・KU | ADMINISTRATIVE DISTRICT SORTING DATA D (KU) |
| ・・CHO, ・・MURA | ADMINISTRATIVE DISTRICT SORTING DATA E (KU. CHO. MURA) |
| OTHERS | ADMINISTRATIVE DISTRICT SORTING DATA F |
| ・・BUILDING CORP. ETC. | BUILDING NAME SORTING DATA |
| ・・INC. LTD. ・・・ETC. | COMPANY NAME SORTING DATA |
| 〒, ⟨〒⟩, ㊄ ETC. | POST-CODE SORTING DATA |

Fig. 12

| CHARACTER TRAIN | SORTING DATA |
|---|---|
| ANDO ・・・・MIYASHITA | SURNAME SORTING DATA |
| TOMOKI ・・・・YASUKO | FIRST-NAME SORTING DATA |

Fig. 31

| SORTING DATA | COORDINATE DATA |
|---|---|
| FIRST-NAME SORTING DATA | HEAD COORDINATE DATA |
| POST-CODE SORTING DATA | HEAD COORDINATE DATA |
| BUILDING NAME DATA | HEAD COORDINATE DATA |
| OTHERS | ADJOINING COORDINATE DATA |

OUTPUT IMAGE DATA GENERATION MEMORY MEDIUM, DEVICE AND PRINTER

BACKGROUND OF THE INVENTION

1. Field of Invention

The present invention relates to an improvement in the technique of creating output image data based on an output format.

2. Description of Related Art

Labels have been widely used to identify personal items by indicating names and addresses thereon, or to organize a collection of items by being pasted on, for example, cassette cases and video tapes. In creating such labels, an output format (a pattern), which is referred to as a template, is prepared in advance of the printing operation and is often used to layout several categories of information, such as, for example, a name, an address, a title and/or an artist-name.

For example, a template for names and addresses includes units (which are a master name and a master address), which is created in advance based on an appropriate output-style as a sample format. When character data is inputted by an operator based on the output-style, the character data in the template is replaced with inputted character data (which represents a name and an address), thereby output image data is created indicating the content of a label and having a desired format.

However, an operator has to input character data based on a predetermined output-style, whenever creating output data with the conventional method. In other words, the operator is unable to use data previously stored in a memory, such as, for example, an address book.

SUMMARY OF THE INVENTION

Therefore, it is an object of the present invention to reduce an operator's burden when creating output image data. More specifically, the object of the invention is to make it possible where an operator does not input data based on a predetermined format, to create the same output image data as the output image data created with data input based on a predetermined format. In order to accomplish the above object, there is provided a memory medium storing a program used for generating image data, the program comprises a position data retrieval program for retrieving position data corresponding to a predetermined output format; an object image data retrieval program for retrieving object image data corresponding to an object image which is formed regardless of the predetermined output format; an identification program for identifying whether the object image data has an identification corresponding to the position data; and an arrangement program for arranging the object image data based on the position data if the identification program identifies that the object image data has the identification corresponding to the position data.

More specifically, another memory medium may be provided, for storing an output image data generation program that is retrieved by a computer and executed to create output image data, based on character train data and output-style data. The output image data is created by automatically replacing template character data (which is created in advance as a master based on a predetermined output format) with inputted character data (which is inputted by an operator without regard to format). The replacement occurs when both of the template character data and the inputted character data has the same identification. Even if a plurality of character trains are included in the template character data and in the inputted character data, only the template character train data, which has the same identification as the inputted character train data, is replaced. When their identification is different, the template character data is kept displayed without replacement, or the other data, such as, for example, blank data and alarm data, may be displayed.

Therefore, an operator does not need to input character data based on the predetermined format. As a result, the operator can easily create output image data, using the data that is created in advance without taking care of the format.

Herein, the term "inputted character data" refers to character data that is inputted by an operator, the term "template character data" refers to character data that is included in a template. Also, "inputted character train" and "template character train" respectively refer to the character train that is represented by the inputted character train or the template character data respectively.

A character train, which is represented by character train data, is a group of characters (letters, numbers and symbols). Each character train has a meaning, and is identified based on its meaning. A character train is identified by sorting data. The sorting data contains data pairs of key character (key word) data and recognition data, which recognizes the identification based on the key character data.

For example, the last character "ken" of a character train, such as "Aichi-ken", is classified as a key character of an administrative district. This key character data forms a pair with the recognition data so as to identify the character train as an administrative district. Thereby, the character train including "ken" at the end is identified as an administrative district. Similarly, a character train, such as "ABC Inc.", including "Inc." at the head or end is identified as a company name. There are further provided post-code, telephone-number, surname and first-name, etc. as identifications.

The memory for storing sorting data can be provided within the memory medium, which stores the output image data generation program, or in another memory medium.

The inputted character data may be identified by an operator, at the same time the data is inputted. Also, the template character data may be identified in advance. In such a case, it is searched whether or not the template character data and the inputted character data have the same identification, and then, the replacement is executed between the character data, without the necessity to identify the character data. On the other hand, if the character data is not identified in advance, the data is first identified using the sorting data. Then, it is searched whether or not the template character data and the inputted character data have the same identification, and the replacement is executed. This data process can be executed against all the character data, or only against the data that needs to be identified, if pluralities of character trains are provided.

Further, the output-style data includes attribute data that represents the attribute of characters, such as, for example, size and typeface. The output-style data may also include maximum area data that indicates the area occupied by inputted character trains. According to the maximum area data, an inputted character train is arranged so as to fully occupy a predetermined area. If the area is not big enough for the inputted character train, the character train is horizontally shortened, or a new line is fed. The maximum area data does not need to be set against all the sorting data, but can be set against some of the sorting data.

Also, the character train is equally arranged within the maximum area so that the output image looks attractive. It is especially effective to apply this process to an inputted character train that is shorter than a template character train, although it can be applied to the opposite case.

The output-style data further includes coordinate data, which is predetermined corresponding to the identification of a character train. The coordinate data contains at least head coordinate data (which indicates the position of the head character), or adjoining coordinate data (which indicates that the character train is positioned next to the last character train). The inputted character data is arranged at a position where the coordinate data indicates.

The memory medium, which stores the above-described output image data generation program, can be removable from a computer, such as, for example, a CDROM, FD and ROM card, or can be attached to the computer, such as, for example, a ROM chip, EPROM chip and hard disk.

Furthermore, the memory medium may be, or may not be optically and magnetically writable.

The memory medium includes a template data memory in which templates are stored, and can be retrieved by a computer. As pluralities of templates are stored in the memory, an operator can select one of the templates in order to create a desired output image.

These templates can contain graphic data, such as, for example, illustration and frame. Thereby, an operator does not necessarily input graphic data to create an output image including graphic data, and can make use of the templates.

Further, it is more effective to apply the above-described output image data generation program to a tape printer, as its format, such as, for example, the size of characters and printing area, is strictly limited while at the same time an attractive output image is desired. Using this output image data generation program, an operator does not need to input character data based on a tape-printing format, and can easily create and print an attractive output image onto the tape. If the tape has an adhesive layer, it can be attached to a desired position on an item, so it is especially convenient.

In the case of modifying output image data in the above-described program, the data that constitutes at least a part of image data (referred to as first data) is automatically replaced with another data. A plurality of data, which has a common point, forms a group, and the first data is replaced with the data which belongs to the same group as the first data (referred to as second data).

The first data and the second data include at least character data, or graphic data. The common point between the data can be having the same data source, the same identification or the same data layout. Also, the first data and the second data can be image data itself, such as, for example, dot data, or the entity of the output image, such as, for example, code data and vector data.

The first data is automatically replaced with the second data when the data processing program is executed. Thereby, an operator does not need to delete the first data before inputting the second data, and can easily create a new output image.

In this process, it is not necessary that the replacement be automatically executed regardless of operator's intention. In other words, the replacement may be executed after the second data is selected by an operator, or it may be executed after searching whether or not the first data and the second data belong to the same group having a common point. Consequently, the first data and the second data can be referred to as the template character data and the inputted character data respectively.

In addition, if an attribute is set against the first data, it is maintained against the second data. The attribute of the first data is set, for example, in the output-style data, the attribute is applied to the second data. Therefore, an operator does not need to input second data with the attribute of first data, and does not have to set the attribute again.

According to an additional aspect of the invention, an output image data generation device comprises: inputted character data storing means for storing inputted character data; output-style storing means for storing output-style data and template character data; and output data generation means for creating output data by replacing the template character data with the inputted character data. An output image is created by automatically replacing the character data, which has the same identification. For example, a computer that can retrieve the output image data generation program from the above-described memory medium is regarded as an output image data generation device.

Additionally, an output system is also provided, which comprises: a memory medium; a computer that has a control portion for retrieving and executing the program in the memory medium, and a data supply portion for supplying the data which is acquired by executing the program; and an output device that is connected to the computer, and indicates output image supplied from the data supply portion. The memory medium stores the output image data generation program to create output data by replacing template character data with inputted character data. The memory medium can be removable from or attached to the computer. The memory medium further may be, or may not be optically and magnetically writable.

In this output system, output image data is created in the computer, and sent to the output device, wherein the created image is outputted on an output medium. Thereby, the output device may comprise a display as an output medium to display output image thereon, such as, for example, a CRT display and a liquid crystal panel. The output device may also comprise a printer as an output medium to print output image onto a sheet or tape.

Further, the printer itself can be regarded as the output system, when having a control portion which can retrieve and execute the above-described program, or the printer itself may comprise a memory medium, wherein the above-described program is stored, not having a control portion therein. In such a case, a computer, which is connected to the printer, retrieves and executes the program, and supplies output image data to the printer.

BRIEF DESCRIPTION OF THE DRAWINGS

These and other aspects and advantages of the invention will become apparent from the following detailed description of embodiments when taken in conjunction with the accompanying drawings, in which:

FIGS. 1A–1C are a functional block diagram showing a computer as a control portion of a tape printer, according to a preferred embodiment of the invention;

FIG. 10 schematically shows a display where an output image, which corresponds to created output image data, is displayed thereon, when the output image data generation program is executed by the computer according to the invention;

FIG. 11 schematically shows data stored in a sorting data memory of the memory medium according to the invention;

FIG. 12 schematically shows another data stored in the sorting data memory according to the invention;

FIG. 31 schematically shows the data stored in a template data memory of the memory medium according to the invention.

DETAILED DESCRIPTION OF PREFERRED EMBODIMENTS

Figure 2:
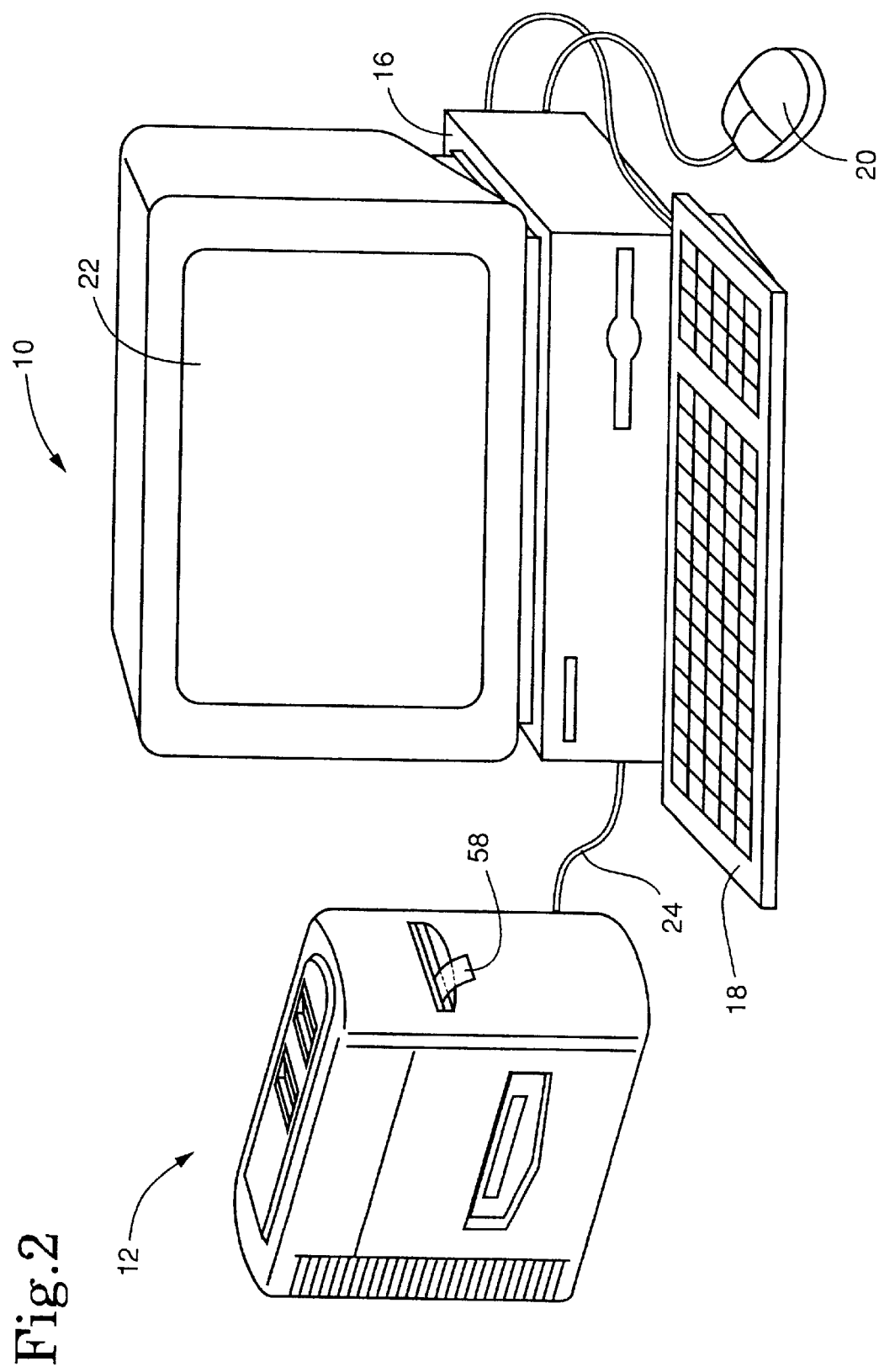
FIG. 2 is a general perspective view of the tape printer of FIGS. 1A–1C and a personal computer according to a preferred embodiment of the invention.

For a general understanding of the features of the invention, reference is made to the drawings. In the drawings, like reference numerals have been used throughout to designate like elements. A tape printer will be described in detail as a preferred embodiment of the invention. The tape printer system includes a computer that can retrieve and execute programs stored in a memory medium, which is an aspect of the invention.

The tape printer system, as shown in FIG. 2, is composed of a personal computer 10 (hereinafter referred to as a computer) as a control portion, and a tape printer 12 as a tape printing portion.

The personal computer 10 preferably includes: computer hardware 16 as a control portion 14 (referring to FIG. 1); a keyboard 18 and a mouse 20 for inputting data; and a display 22 as an output device. The computer 10 is connected to the tape printer 12 with a connecting line 24. The tape printer 12 is also an output device of the personal computer 10.

Figure 3:
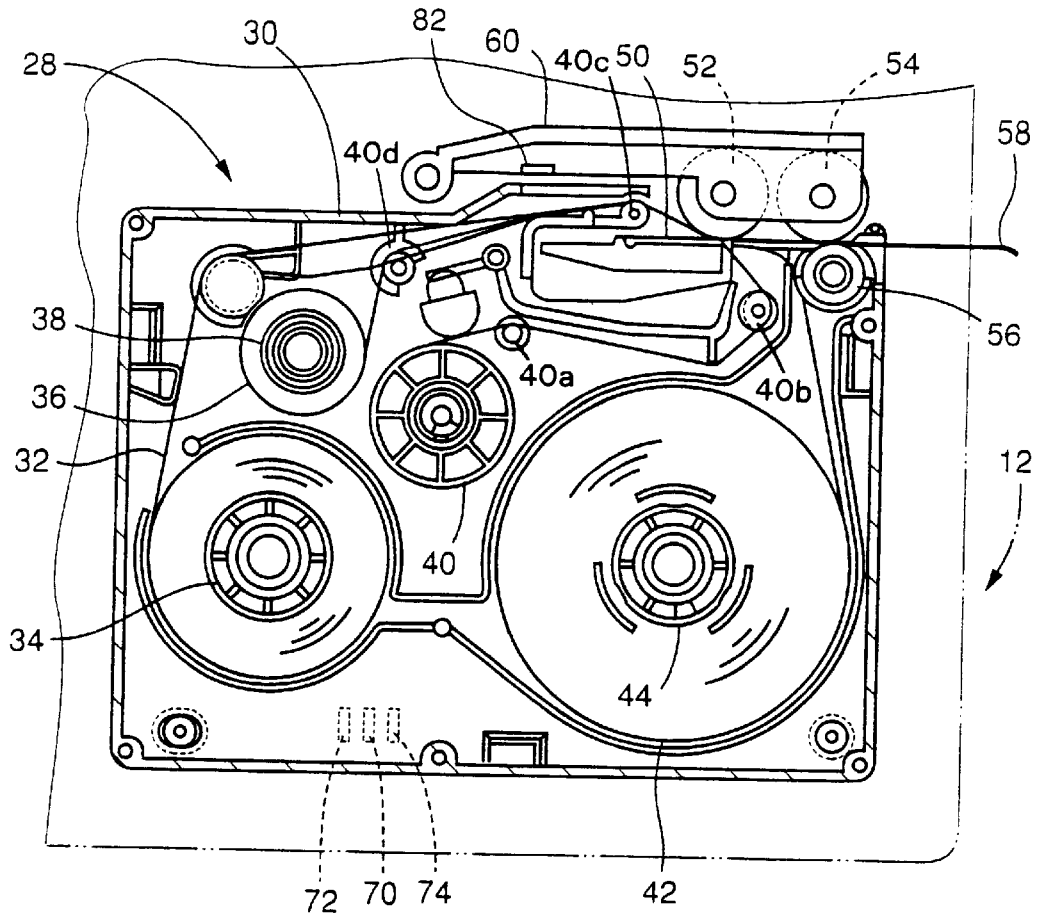
FIG. 3 is a top view showing a tape cassette loaded in a tape printer as a printing portion of the tape printer.
Figure 4:
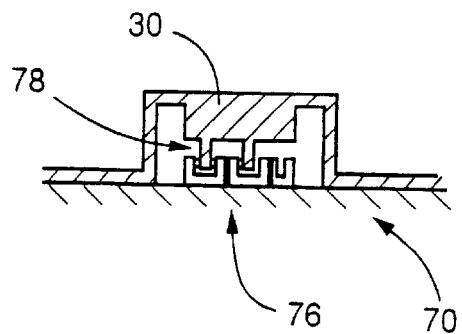
FIG. 4 is a sectional view of a tape-width sensor provided on the tape printer of FIG. 2.

First, the tape printer 12 will be described, referring to FIGS. 3 and 4. The tape printer 12 prints an output image onto a tape-shaped printing medium. As shown in FIG. 3, the tape is installed in a tape cassette 28, which is loaded in the printer 12.

The tape cassette 28 preferably comprises: a cassette frame 30; a tape spool 34 around which a transparent laminate film 32 is wound; a ribbon supply spool 38 around which an ink ribbon 36 is wound; a take-up spool 40 for taking up the ink ribbon 36; and a tape supply spool 44 around which a double sided adhesive tape 42 is wound with its peel-off paper on the outside. Each spool 34, 38, 40 and 44 is attached within the cassette frame 30, so as to rotate in synchronism with each other.

The ink ribbon 36 is supplied from the ribbon supply spool 38, and is taken up around the take-up spool 40 via a plurality of feed rollers 40a, 40b, 40c, 40d. A thermal head 50 is positioned where the laminate film 32 and the ink ribbon 36 overlap each other. A platen roller 52 is provided opposite to the thermal head 50, and serves to press the laminate film 32 and the ink ribbon 36 against the thermal head 50 which has heating elements (not shown) disposed thereon. Being pressed with the heating elements on the thermal head 50, ink from the ink ribbon 36 is transferred onto the laminate film 32 thereby forming the output image on the film. Next, the double sided adhesive tape 42 is supplied, attached to the laminate film 32, and pressed by a pair of joining rollers 54 and 56, which are located on the both sides of the film, so as to form the print tape 58. The joining roller 56 also works as a tape feed roller to discharge the print tape 58 out of the tape printer 12. The platen roller 52 and the joining roller 54 are supported by a roller support portion 60 that is disposed adjacent to the tape cassette 28, and which can rotate around an axis 60a.

A tape feed motor 64 (referring to FIG. 1) drives in a direction to rotate the joining roller 56 and the take-up spool 40 in synchronism with each other, while at the same time the thermal head 50 is controlled. Thereby, the output image is printed on the laminate film 32, which is discharged as the print tape 58 with the double sided adhesive tape 42 attached thereto, as described above.

A pair of blades, (not shown), including a stationary blade and a movable blade is provided in the tape printer 12. The movable blade is swung by a cutter drive motor 66 (FIG. 1). The print tape 58 is cut through cooperation of the stationary blade and the movable blade.

The tape cassette 28 varies depending on a tape-width, a color and a type. There are provided four types of tape: the laminate type tape formed from the laminate film 32 and the double sided adhesive tape 42 stuck together; a non-laminate type tape, which eliminates the use of the laminate film and prints on a single coated tape with the peel-off paper attached to its outer side; a heat-sensitive type tape; and an instant lettering type tape. For each of the four kinds of tape cassette, there are provided six tape-widths (6 mm, 9 mm, 12 mm, 18 mm, 24 mm and 36 mm), and thirteen tape-colors, such as, for example, red, blue and green.

In the present embodiment, the kinds of tapes (kinds of tape cassettes 28) are detected by a tape-width sensor 70, a tape-color sensor 72 and a tape-type sensor 74 that are provided on the tape printer 12. Each sensor preferably comprises a plurality of grooves. For example, as shown in FIG. 4, the tape-width sensor 70 comprises three grooves 76, which confront projecting pieces 78 on the cassette, when loaded in the printer 12. (The projecting pieces may not be provided for some tape cassettes, although two projecting pieces are provided in the present embodiment, as shown in FIG. 4). The engaging condition between the grooves 76 and the projecting pieces 78 is optically detected, thereby, the tape-width sensor 70 detects the tape-width. With three grooves, as shown in FIG. 4, there are eight possible engaging conditions. In the same way, the tape-color sensor 72 detects the tape-color, corresponding to the engaging condition. (There are sixteen possible engaging conditions, as the tape-color sensor 72 has four grooves (not shown). The tape-kind sensor 74 detects the tape-kind. (There are four possible engaging conditions, as the tape-kind sensor 74 has two grooves (not shown).)

Further, the tape printer 12 preferably has a cassette switch 80 (FIG. 1) for detecting the existence of the cassette 28, and a tape end sensor 82 for detecting whether or not the tape reaches its end. The tape end sensor 82 is provided opposite to an opening in the roller support portion 60, and detects an end mark is provided on an end portion of the laminate film 32.

Next, the control portion 14 of the computer 10 will be described with reference to FIGS. 1 and 2.

As shown in FIG. 1, the control portion 14 preferably has a CPU 89, a RAM 90, a ROM 91, an input/output interface (I/F) 92, a communication I/F 93, a hard disk (HD) drive 94, a CDROM drive device 95, and a floppy disk (FD) drive device 96. The keyboard 18, the mouse 20 and the display unit 22 are connected to the input/output I/F 92. Also, the CDROM drive device 95, the FD drive device 96 are connected to the input/output I/F 92. The display unit 22 preferably includes a CRT display (CRTD) 96 as a display panel, and a CRT controller (CRTC) 97.

The CDROM drive device 95 has a CDROM drive (CDD) 100 for retrieving information in the CDROM 99 (which is a memory medium according to the present embodiment), and a CDROM drive controller (CDC) 101 for controlling the CDD 100. When the CDROM 99 is inserted into the CDROM drive 95 and installed according to predetermined procedures, various programs and data in the CDROM 99 are retrieved, and stored in the hard disk 102. Similarly, the FD drive device 96 includes a FD drive (FDD) 103 for retrieving information in a floppy disk (which is also a memory medium according to the invention; not shown), and a FD drive controller (DFC) 104 for controlling the FDD 103.

The computer 10 does not necessarily have both of the CDROM drive device 95 and the FD drive device 96, but preferably has at least one of them. Further, the display unit 22 may have a liquid crystal display instead of the CRTD 96, or any other appropriate display. Characters, templates, two-dimensional code and selected images are displayed on the CRTD 96, thereby the display unit 22 can be regarded as constituting an output device of the various data.

The keyboard 18 is operated mainly to input character data. It is also operated to set a printing condition, to initiate printing, or to command various operations to the computer 12. However, these operations are often executed by operation of the mouse 20.

The information which represents a printing condition includes cassette information and operating condition information, which represents the operating condition of each portion in the printer 12, such as the cutter drive motor 66. The tape printer control information (referred to as printing information hereinafter) includes the information and printing command information. The printing command information can be included in the printing information, as portions of the printer 12, such as the feed motor 64 and the thermal head 50, start operating according to the printing command. The tape printer 12 is connected to the communication I/F 93 via the connecting line 24.

The RAM 90 preferably comprises: a character data memory 110 for storing character data; a dot data memory 111 for storing dot data to be sent to the tape printer 12; a printing information memory 112 for storing the printing information; a status information memory 113 for storing status information, which represents the operating state of the tape printer 12, transferred therefrom; an error data memory 114 for storing error data of the computer 10; and an image data memory 115 for storing image data selected by an operator.

The RAM 90 also has a plurality of memories for tape printing, such as: a selected template data memory 116 for storing template data selected by an operator; an output template data memory 117 for storing template data to be outputted; and a two-dimensional code data memory 118 for storing two-dimensional code data. Template data includes graphic data, character train data and output-style data that indicates the attribute of characters, such as, for example, size and typeface.

The HD drive device 94 preferably comprises: a hard disk drive (HDD) 121 for retrieving information (various programs and data) in the hard disk 102; and a hard disk drive controller (HCD) 122 for controlling the HDD 121. The hard disk 102 has many data memories, such as, for example, an image data memory (image file) 125 and a pattern data memory 126. The image file 125 stores image data (dot data) in correspondence with their image data names. The image file may further store the image data as vector data. The pattern data memory 126 stores outline data for converting character data into dot data. The outline data represents characters in correspondence with the character data on each typeface (Gothic type, Mingcho type, etc.).

Further, there are provided many program memories in the hard disk 102, such as, for example: a printing control program memory 129; a display driving program memory 130; a dot data converting program memory 131; and a data transfer control program memory 132. The display driving program memory 130 is for storing a display driving control program, which controls the CRTC 97, and converts character data and image data into dot data to be displayed on the CRTD 96. The dot data converting program memory 131 is for storing a dot data converting program, which converts character data into dot data to be printed. The data transfer control program memory is for storing a data transfer control program, which controls the transfer of the dot data and the printing information, etc. to the printer 12.

The character data included in the output template data, which is stored in the output template data memory 117 of the RAM 90, is converted into dot data according to output-style data. After that, the output template data is combined with graphic data, and stored in the dot data memory 111.

In the present embodiment, various programs and data are once stored in a CDROM information memory 133 of the hard disk 102, after being installed and retrieved from the CDROM 99 and the other memories. Then, these programs are retrieved and stored in the RAM 90 again when they are executed.

The CDROM 99 (mentioned above) has data memories and program memories. The data memories include: a template data memory 140 for storing template data; an image data memory (clip art) 141 for storing image data (dot data); and a sorting data memory for storing sorting data to identify character trains. The program memories preferably include: an identification program memory 146; a two-dimensional code data conversion program memory 147; a dot data conversion program memory 148; an output image generation program memory 149; an image data processing program memory 150; and an image data modifying program memory 151.

The identification program memory 146 is for storing an identification program, which identifies character trains according to sorting data. The two-dimensional code data conversion program memory 147 is for storing a two-dimensional code data conversion program, which converts character data into two-dimensional code data. The dot data conversion program memory 148 is for storing the program to convert the two-dimensional code data into dot data. The output image generation program memory 150 is for storing an output image data generation program, which creates output image data using template data. The image data processing program memory 150 is for storing an image data processing program to manipulate image data. The image data modifying program memory 151 is for storing an image data modification program to modify image data. The image data processing program may include a clip art data processing program and an image file data processing program.

The data supplying portion preferably comprises the communication I/F 93, the connecting line 24, the dot data memory 111, the data transfer control program memory 132, and the portion that executes the data transfer control program in the CPU 89. The main control portion of the computer 10 consists of the CDROM drive device and the CPU 89. In the present embodiment, various programs and data for printing are stored in the hard disk 102 of the computer 10. However, these programs and data can be also stored in the CDROM 99.

The printing programs and data are originally stored in a memory medium, such as the hard disk 102 disposed to the computer 10. Therefore, the programs in the CDROM 99 can be executed using the programs and data in the memory medium. Also, exclusive printing programs and data can be stored in the CDROM 99 independently. Further, various programs and data in the hard disk 102 can be stored in the ROM 91.

Similarly, the tape printer 12 has a control portion 160, which mainly consists of a computer. The control portion 160 preferably comprises a CPU 161, a RAM 162, a ROM 163, an input/output I/F 164, and a communication I/F.

The tape-width sensor 70, the tape-color sensor 72, the tape-type sensor 74, the cassette switch 80 and the tape-end sensor 82 are respectively connected to the input/output I/F 164. The thermal head 50, the feed motor 64, and the cutter drive motor 66 for driving the cutter are also connected to the input/output I/F 164 through each drive cycle 167, 168 and 169.

The RAM 162 preferably comprises: a receiving buffer for storing the data that is supplied from the computer 10; a printing buffer for storing heating element control data; a cassette information memory for storing cassette information, such as types and loading states; and an error information memory for storing errors.

The data supplied from the computer 10 and stored in the receiving buffer includes dot data and printing information. Further, cassette state information and error information is combined into status information (mentioned above), which is sent to the computer 10.

The ROM 163 preferably includes many programs, such as, for example: a data transfer control program for controlling communication between the computer 10 and the printer 12; a head control program, which converts dot data supplied from the computer 10 into heating elements control data; and a printing drive control program for controlling the thermal head 50, the feed roller 64 and the like according to the printing information.

Communication is executed between the computer 10 and the tape printer 12. This communication will not be explained in detail, as it has previously been disclosed in U.S. Pat. No. 5,538,352, which is herein incorporated by reference. The printing information is transferred from the computer 10 to the tape printer 12, at the same time dot data is supplied by one byte. The thermal head 50 and the other portions of the tape printer 12 are controlled according to the printing information and the dot data, thereby printing is executed. The print tape 58 having the adhesive layer can be easily pasted on a desired position by an operator.

Figure 5:
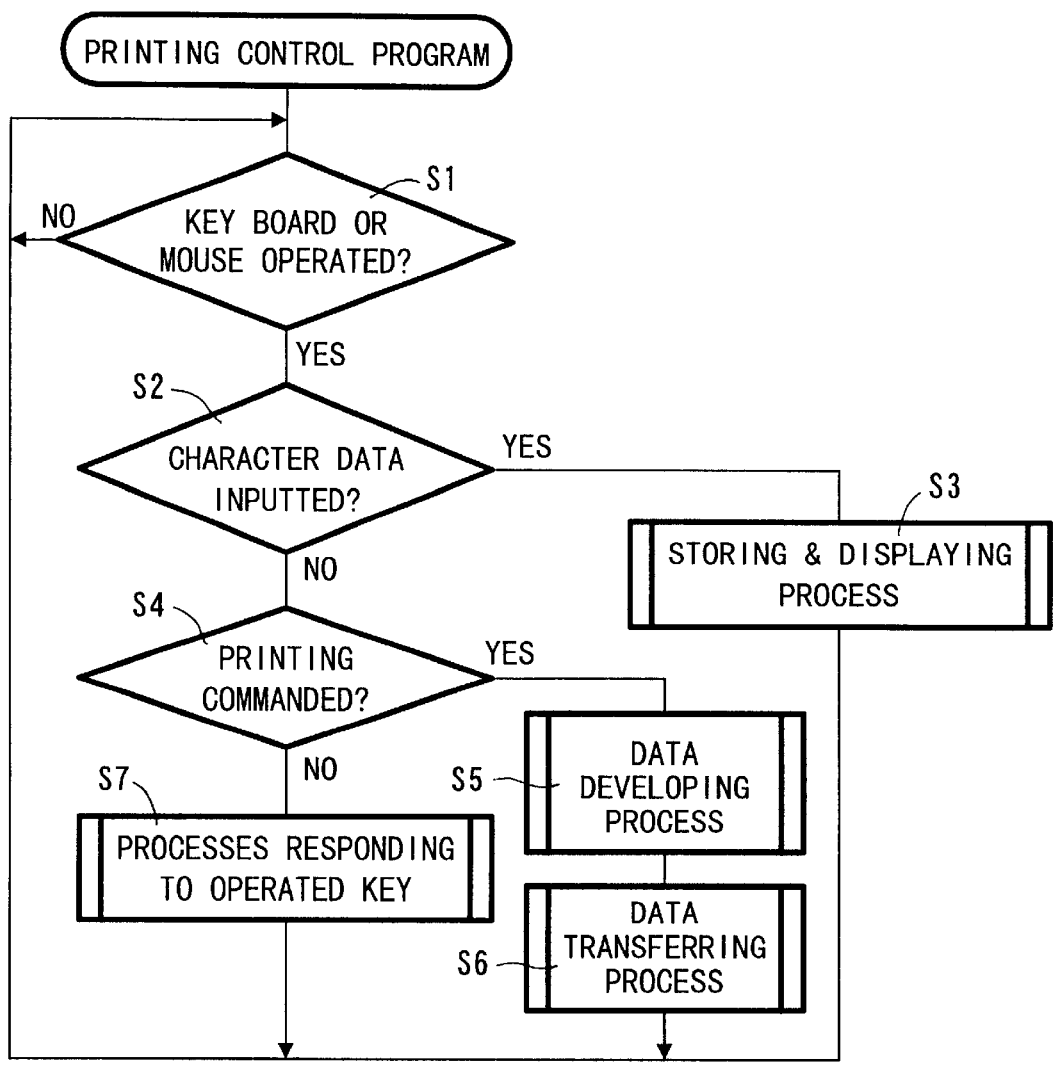
FIG. 5 is a schematic flowchart showing a printing control program stored in a hard disk of the computer according to a preferred embodiment of the invention.

Now, a printing control program, which is executed by the computer 10, will be explained with reference to the flowchart of FIG. 5.

The computer 10 first judges whether or not a keyboard (or a mouse) is operated in step S1. If any data is inputted ("Yes" in step S1), the computer 10 judges whether or not the inputted data is character data in step S2. If it is character data ("Yes" in step S2), the data is stored in the data memory 110, and is then displayed on the CRTD 96 in step S3. If not ("No" in step S2), the computer 10 judges whether or not printing is commanded in step S4. If printing is commanded ("Yes" in step S4), the data in the data memory 110 and the output template data memory 117 is converted into dot data, and stored in the dot data memory 111 in step S5. The dot data is transferred to the tape printer 12 with printing information in step S6. The image data in the selected template data memory 116 is kept stored in the dot data memory 111 without being converted, and then transferred to the tape printer 12. Two-dimensional code data is converted into printing dot data according to the dot data conversion program, and then also transferred to the tape printer 12. On the other hand, if printing is not commanded in step S4, a suitable process is executed according to inputted data in step S7. For example, if inputted data is printing information, it is stored in the printing information memory 112. If the data commands any operation to the computer 10, the operation is executed according to the command.

Figure 6:
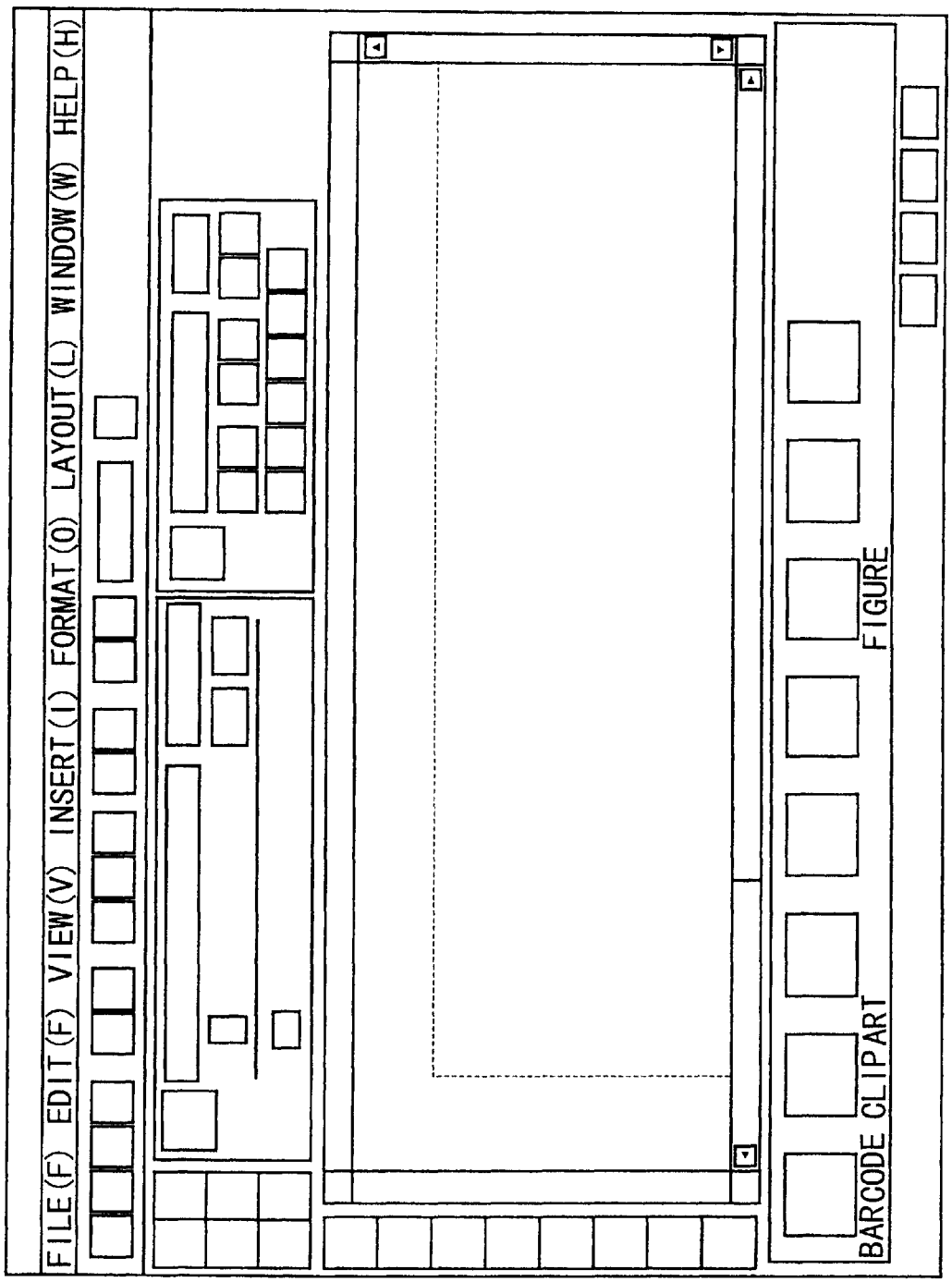
FIG. 6 schematically shows a CRT display, when a tape-printing data generation program is retrieved from a memory medium, and executed by the computer according to the invention.

When "tape printing data generation (P-touch)" is selected from the program menu, the display shown in FIG. 6 is displayed on the CRTD 96.

The output image data generation program is executed by selecting "Edit (F)" "Format (0)" on the display shown in FIG. 6. The output data generation program for creating output template data will later be described with reference to the flowchart of FIG. 7. At the time when "Format (0)" is clicked, a plurality of character train data in the character data memory 110 of the RAM 90 is replaced with template character data.

The output template data (output image data) is formed, based on the character train data inputted by an operator and the template data selected by the operator. The output template data, which is created using this program is the same as the data inputted directly by an operator based on the template.

The template data memory 140 of the CDROM 99 stores a plurality of template data. The template data preferably includes output-style data, template character data and graphic data, but some may not include graphic data.

For example, the template data stored as data (4) (which corresponds to template 178 shown in FIG. 8) includes: template character data, which represents character trains 180 to 187; graphic data, which represents a figure 188, and output-style data. The character trains 180 to 187 are created based on the output-style data. The template character data is stored so as to correspond to sorting data, which identifies each template character train 180 to 187.

Each character train is identified by its meaning, according to sorting data. For example, if a character train represents a surname, the character train is identified as a surname, and stored corresponding to a surname sorting data. There are further provided as sorting data: first-name sorting data; company name sorting data; post-code sorting data; administrative district sorting data A (Tokyo-to), B (ken, fu, dou), C (shi, gun), D (ku), E (cho, mura), and F (the other place name); house-number sorting data; and building name sorting data.

Figure 8:
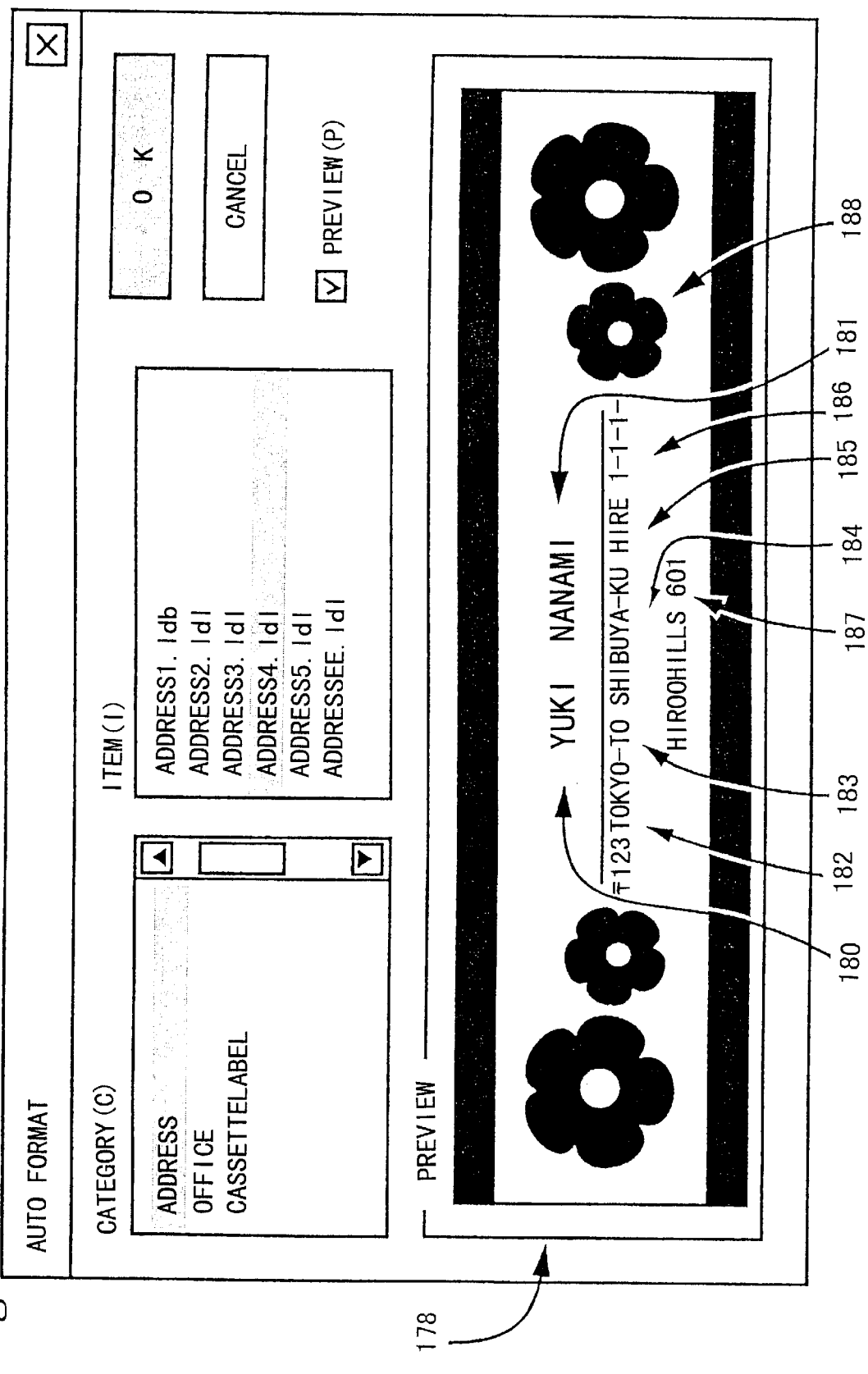
FIG. 8 schematically shows a CRTD where template data can be selected thereon, when the output image data generation program is executed by the computer according to the invention.

The character trains 180 to 187 in the template 178, as shown in FIG. 8, are respectively identified as surname, first-name, post-code, administrative district A, D and F, house-number, and building name. The template character data, which represents the character trains 180 to 187, is stored corresponding to each of the sorting data.

Further, the output-style data includes attribute data (which represents size, typeface of characters), and maximum area data that indicates the maximum area occupied by a character train.

Figure 9:
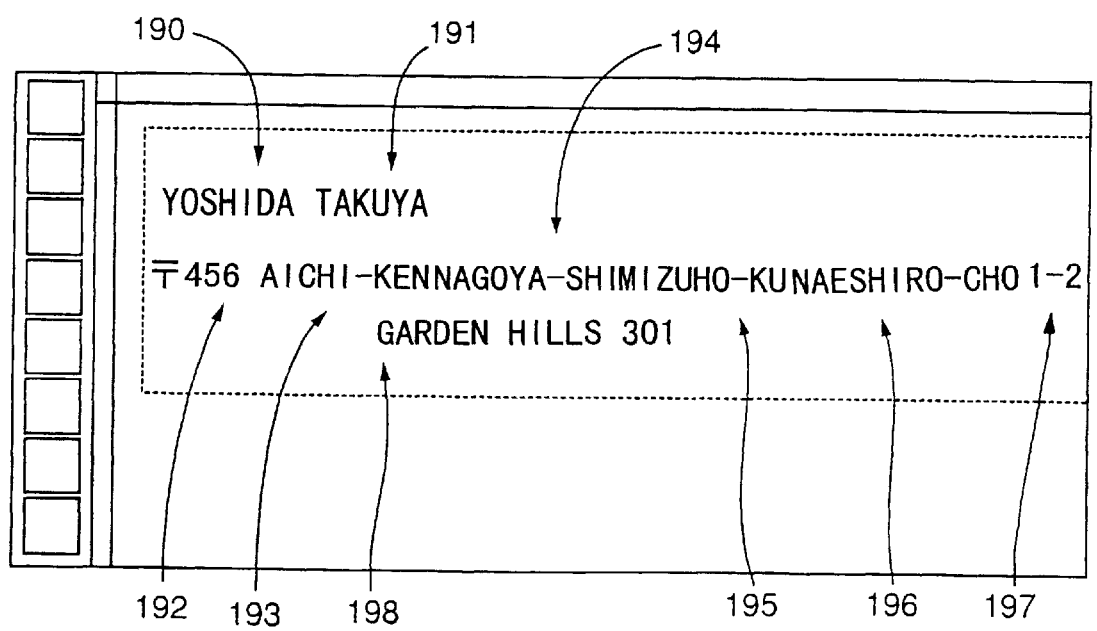
FIG. 9 schematically shows a display where a character train, which corresponds to character data inputted by an operator, is displayed thereon according to the invention.

In the present embodiment, the maximum area data is stored only against the surname sorting data and the first-name sorting data. However, an operator can input character data without taking care of output-style or attributes, and does not need to identify character trains. In the present embodiment, character trains 190 to 198 (referring to FIG. 9) inputted by an operator are automatically identified when the identification program is executed, using sorting data (described later).

The sorting data in the sorting data memory 142 is for identifying character trains, as mentioned above. The sorting data contains data pairs of key character data (key word data) and its specific recognition data, and data pairs of character train data and recognition data. The identification program is executed according to the sorting data, thereby each character train is identified in the present embodiment. The sorting data may be referred to as "thesaurus".

For example, as shown in FIG. 11, "shi" is registered as a key character data so as to form a pair with the recognition data that represents an administrative district C. Thereby, the character train containing "shi" at the end is identified as an administrative district C "shi".

Many surnames and first-names themselves are registered, corresponding to surname recognition data and first-name recognition data, as shown in FIG. 12. Further, all the administrative districts (for example, of Japan) can be registered, corresponding to administrative district recognition data, without using key character (such as "ken" and "shi"). Even if such character trains are not registered corresponding to recognition data in advance, an operator can add these character trains in the sorting data memory so as to identify the character trains later.

Figure 7:
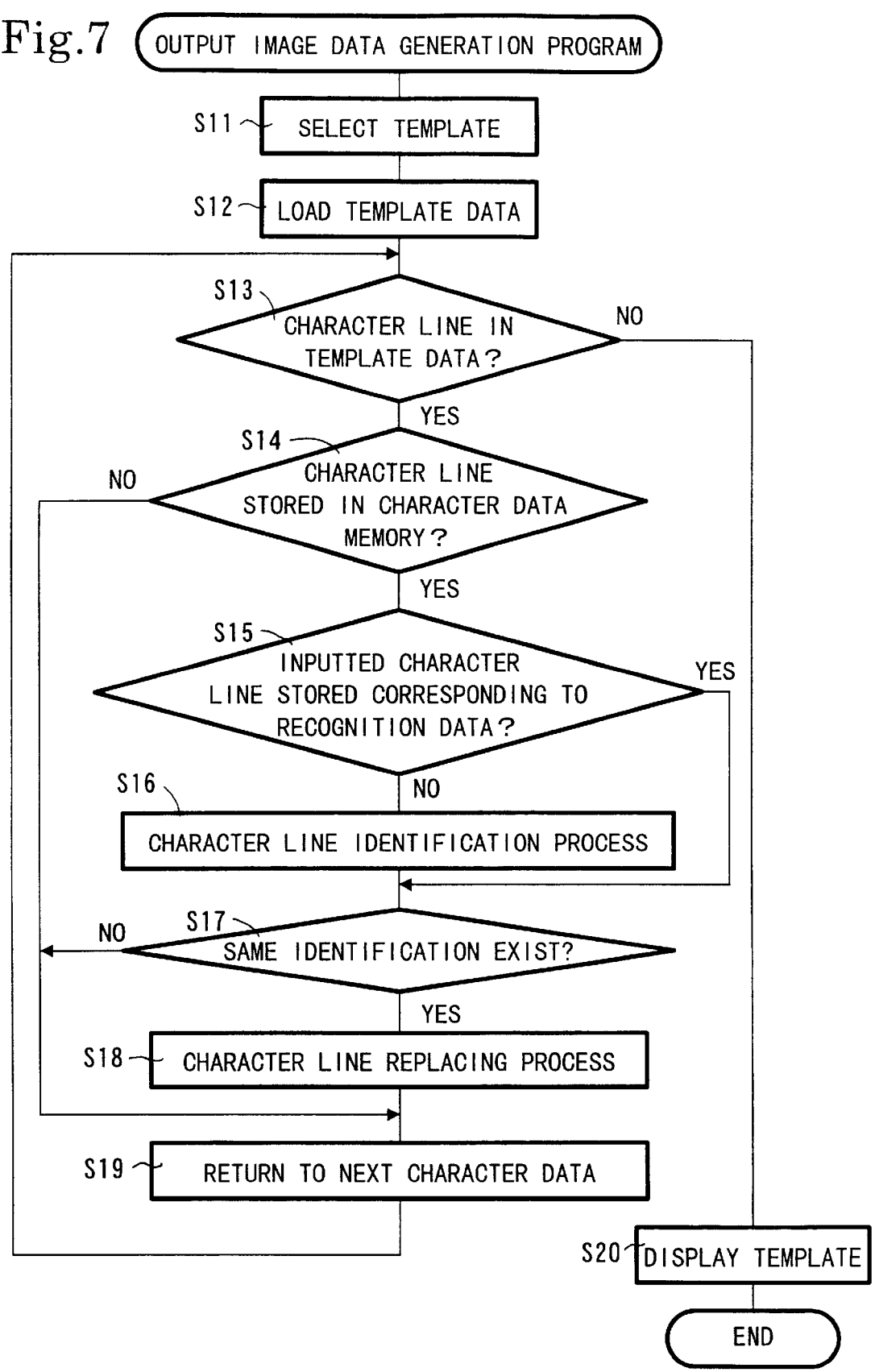
FIG. 7 is a schematic flowchart showing an output image data generation program stored in the memory medium according to a preferred embodiment of the invention.

Next, the output image data generation program for creating output template data will be described with reference to the flowchart of FIG. 7.

On the display shown in FIG. 8, a desired template (one of the templates (1) to (4)) is first selected by specifying its address by operation of the mouse 20 in step S11. The selected template is stored in the selected template data memory 116 of the RAM 90. In the case of selecting the template (4), the template 178 (which is for a name-plate) corresponding to the template data (4) is displayed on the CRTD 96 in step S12.

Then, template character data is replaced with the character data inputted by an operator in steps S13 to S19. In step S13, the computer searches and judges whether or not the template data includes character train data. In step S14, the computer judges whether or not inputted character data is stored in the character data memory 110. If inputted character data is stored ("Yes" in step S14), the computer judges whether or not the inputted character data is identified, corresponding to its recognition data in step S15.

If the recognition data is not inputted by an operator in advance ("No" in step S15), it is identified according to sorting data of the template in step S16, and then, searched whether it has the same identification as the character train in the template in step S17. If the inputted character train has the same identification ("Yes" in step S17), the character train in the template is replaced with the inputted character train in step S18. In this case, its attribute is maintained. Then, the data process for the other character train data is prepared in step S19.

When steps S13 to S19 are executed for the first time, the character train 180, which is located at the head of all of the character trains in the template 178, is first processed. In this case, as the character train 180 represents a surname, the character trains 190 to 198 are searched whether they also represent a surname. The character train 190, which represents a surname, is picked up, and replaces the character train 180. The other character trains 181 to 187 are processed one after another in the same way, after the character train 180. After the character train 187 is replaced with the inputted character train 198, the next character train data is searched.

In the present embodiment, any character train data is not included after the character train data 187, thereby it is judged "No" in step S13. Then, in step S20, the output template 199 is displayed as shown in FIG. 10. The output template data, which represents the output template 199, is stored in the output template data memory 117. According to the printing command, the character train data is converted into dot data, which creates output image data with graphic data. The output image data is stored in the dot data memory 111 and sent to the tape printer 12. The output template 199 (shown in FIG. 10) is printed onto the printing tape 58 within the tape printer 12.

Conversely, if character data is inputted corresponding to recognition data ("Yes" in step S15), the template character data is immediately replaced with inputted character data, without searching whether the inputted character data has the same identification. In such a case, the replacement is executed between character trains, which have the same identification, without any mistakes.

If the inputted character train does not have the same identification ("No" in step 17), the data process for the other character train data is prepared without replacing the template character data. Further, if character data is not stored in the character data memory 110 of the RAM 90, steps S13 and S14 are repeatedly executed. If it is judged "No" in step S13, the template 178 is kept displayed in step S20, as shown in FIG. 8.

As mentioned above, the maximum area data is set against the surname sorting data and the first-name sorting data in the present embodiment. If the area is not enough to be occupied by an inputted surname 190 or first-name 191, the character trains 190 and 191 are horizontally shortened and replace the character trains 180 and 181.

When selecting the other template on the display shown in FIG. 8 soon after creating the output template 199, the same data process is repeated. The character train data in the data memory 110 is used again to create an output template corresponding to the newly selected template.

Further, in the case of storing a plurality of names and addresses in an address book, which is stored, for example, in a hard disk, the address book can be used for creating the output template data. In this case, the data in the address book is retrieved by the FD drive device 95, and is stored in the data memory 110 so as to replace the template character data. If the retrieved data is stored in the other memory, the program can be changed so as to search the other memory in step S14, thereby the output template data is created in the same way.

The templates can be used for creating not only a nameplate but also a tape cassette label and a video cassette label. In the case of creating a tape cassette label, an operator needs to select a desired template for a cassette, on the display shown in FIG. 8. In such a template, the template character data is stored corresponding to recognition data that represents a title or an artist name. In this way, the output template data is created by automatically replacing the template character data (included in a template as a master) with inputted character data (inputted by an operator) in the present embodiment. Therefore, an operator does not need to input character data based on an output style so that the operator's burden is reduced when creating the output template data. Further, the created template data looks attractive, as inputted character trains are equally arranged in the maximum area, which is predetermined depending on each sorting data.

As described above, in the present embodiment, the inputted character data storing means preferably comprises the character data memory 110 of the RAM 90. The output-style data storing means preferably comprises the template data memory 140 of the CDROM 99 and the selected template data memory 116 of RAM 90. The output image data generation means preferably comprises the dot data conversion program memory 131 of the hard disk 102, the output image data generation program memory 149 of the CDROM 99, the sorting data memory 146, the CDROM drive device 95, and the portions that execute the programs in the CPU 89. Each program is executed by the CPU 89, wherein each of step S16, S17 and S18 respectively corresponds to the identification process, the searching process and the replacing process (arranging process).

The hard disk 102 is considered a memory medium of the present invention, as the programs in the CDROM 99 are installed in the hard disk 102. The programs in the hard disk 102 are retrieved by the HD drive device 94, and are executed by the CPU 89.

Further, the template data and the sorting data may be stored in the hard disk 102 of the computer 10, although this data is stored in the CDROM 99 in the present embodiment. However, the output image data generation program can be executed, even if a computer does not store the data therein, when the CDROM 99 stores the data. Thereby, the effect of the present invention can be widely applied.

When an inputted character train and a template character train do not have the same identification ("No" in step 17), the template character train may be replaced with a blank, although it is maintained as it is in the present embodiment.

The selected template is not necessarily displayed on the CRTD 96. The output template 199 alone may be displayed after the template character data is replaced with the inputted character data.

Figure 30:
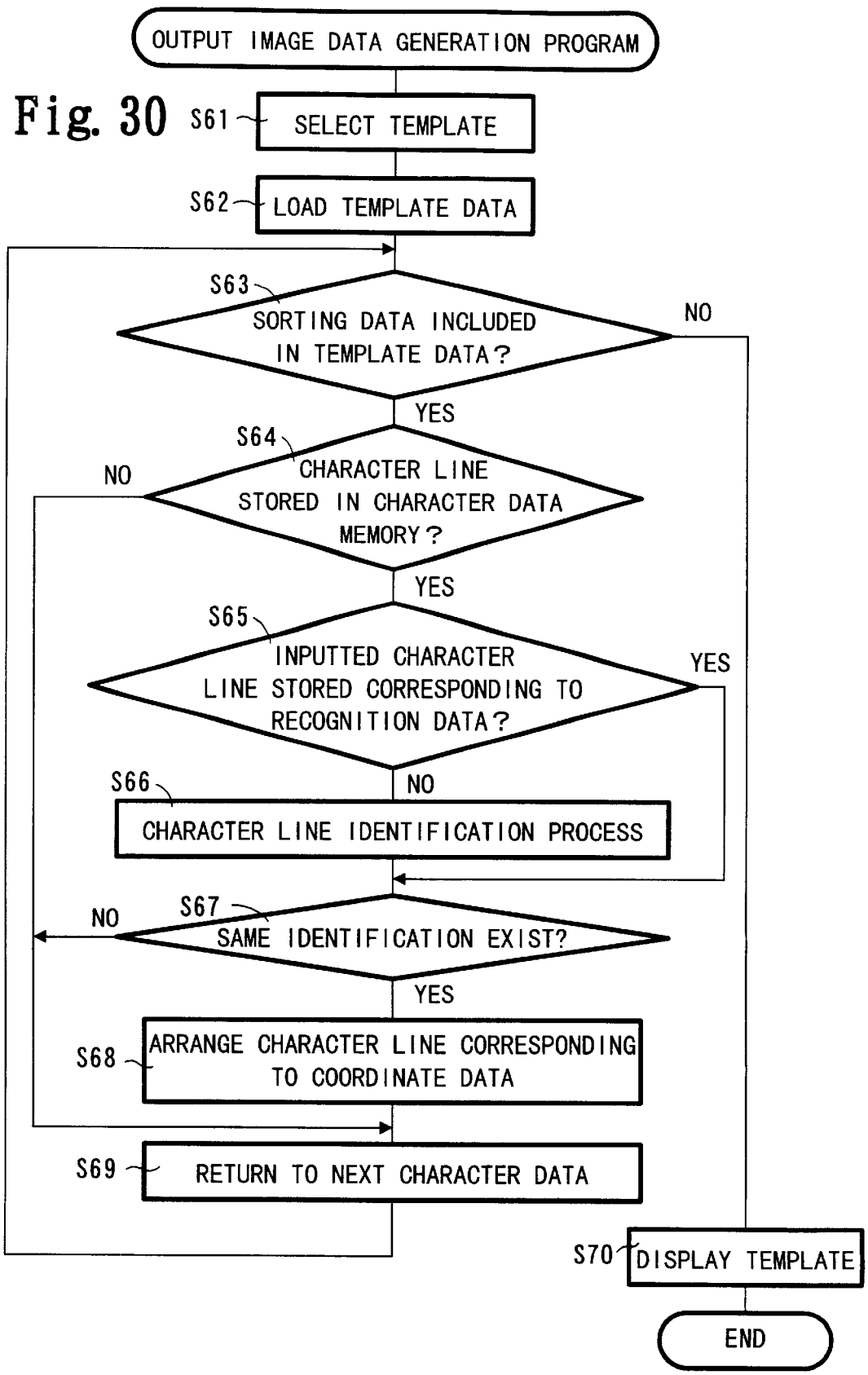
FIG. 30 is a schematic flowchart showing the output image data processing program stored in a different memory medium from the memory medium according to a preferred embodiment of the invention.

In the present embodiment, the template data is stored in the template data memory 140 of the CDROM 99, including template character data. However, template data may include sorting data and its coordinate data instead of the template character data. In such a case, the output image generation program is stored in the CDROM 99, and executed as shown in the flowchart of FIG. 30. In step S63, the computer 10 judges whether or not the template data includes sorting data. Then, the inputted character data is searched whether or not it is identified corresponding to the sorting data in step S65, and arranged at a position where the coordinate data indicates in step S68.

The coordinate data indicates the position of the head character (which will be referred to as head coordinate data hereinafter) against the character train, which is positioned at the head of a line. Or, the coordinate data indicates that the character train is positioned next to the last character train (which will be referred to as adjoining coordinate data) against the other character trains. As shown in FIG. 31, sorting data and coordinate data are stored corresponding to each other. In particular, it is desirable that first-name data corresponds to the head coordinate data. For example, as shown in FIG. 30, surname data, first-name data, post-code data and building name data corresponds to the head coordinate data, the other data corresponds to adjoining coordinate data.

Now, modification of the image data will be described in detail.

In the present embodiment, as mentioned above, the image data memory (image file) 125 is provided in the hard disk 102, and stores a plurality of image data corresponding to specific image data names. An another image data memory (clip art) 141 is provided in the CDROM 99, and stores a plurality of image data as it is. In the case of printing figures, an operator can create image data, or can use image data stored in the image file 125 and the clip art 141.

In case of creating image data, the clip art data processing program is executed by selecting "Clip Art" on the program menu.

Figure 13:
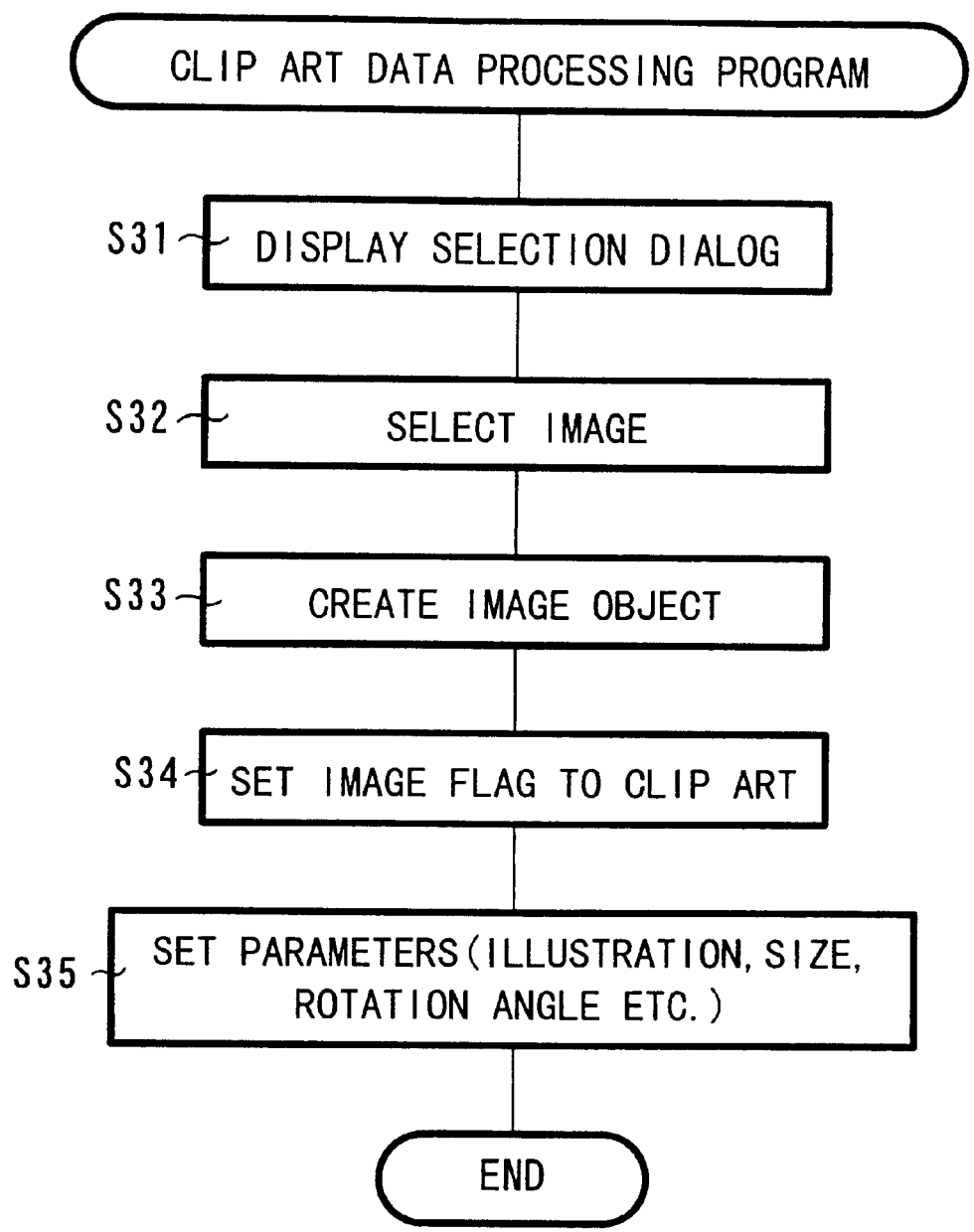
FIG. 13 is a schematic flowchart showing a clip art data processing program stored in the memory medium according to a preferred embodiment of the invention.
Figure 16:
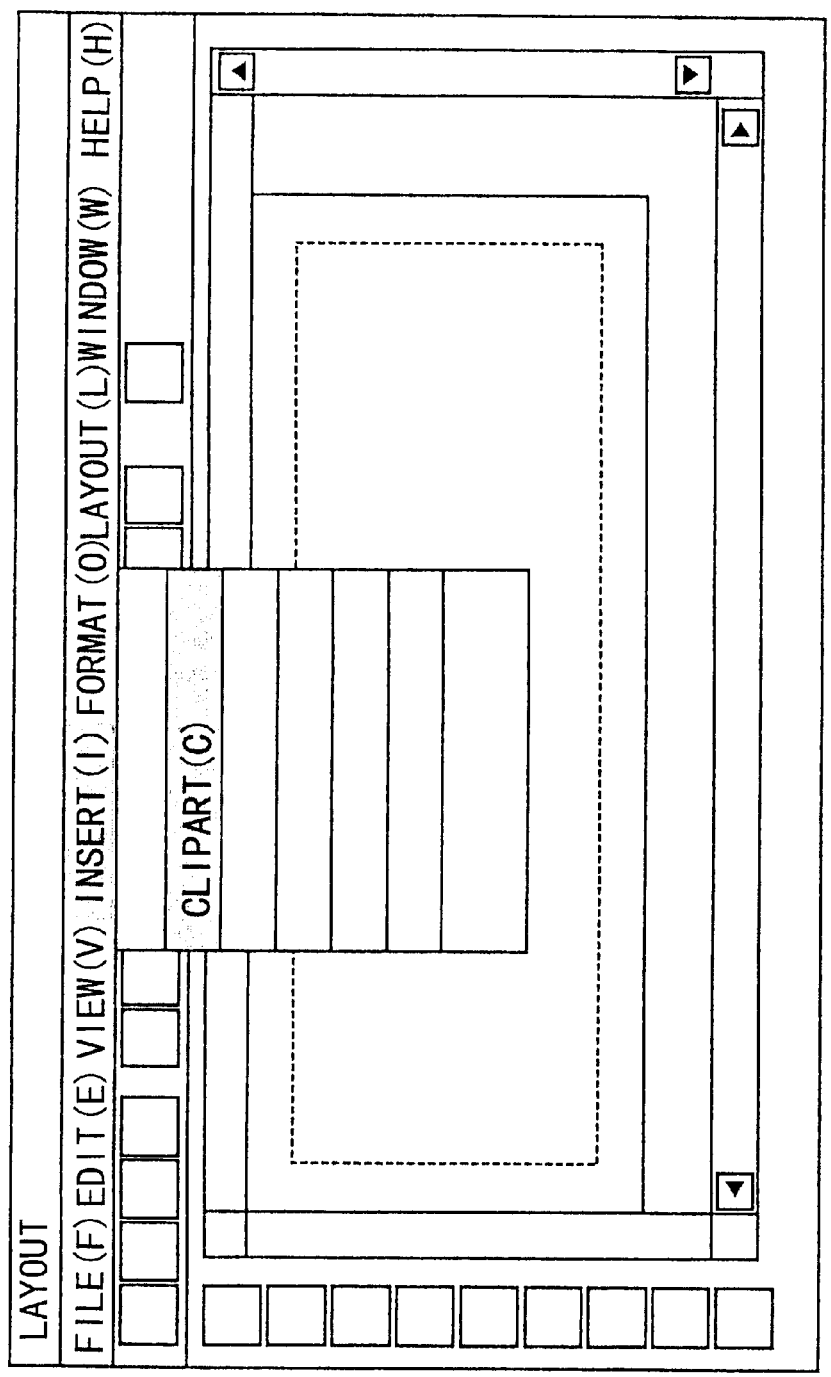
FIG. 16 schematically shows a display where image data is being created by an operator, using a plurality of image data in the clip art according to the invention.
Figure 17:
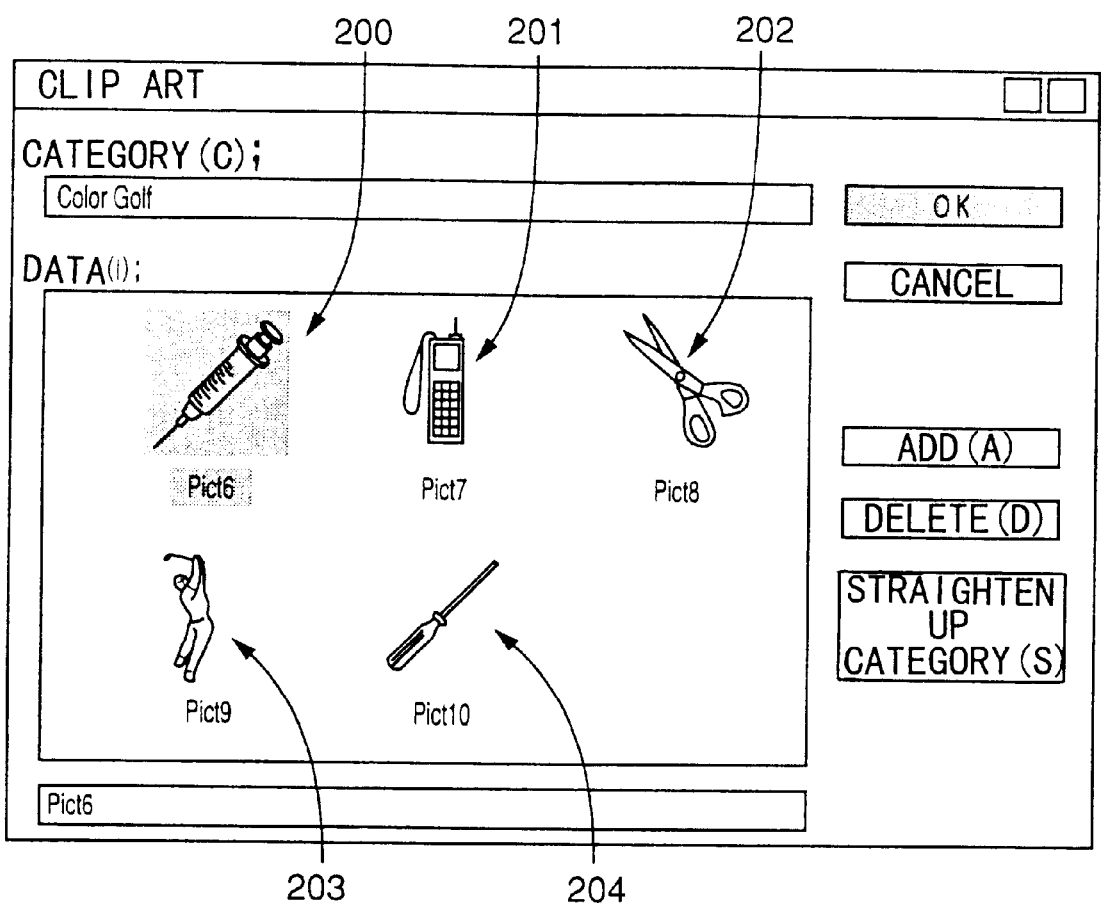
FIG. 17 schematically shows a CRTD where one of the image data in the clip art can be selected, when the clip art data processing program is executed by the computer according to the invention.
Figure 18:
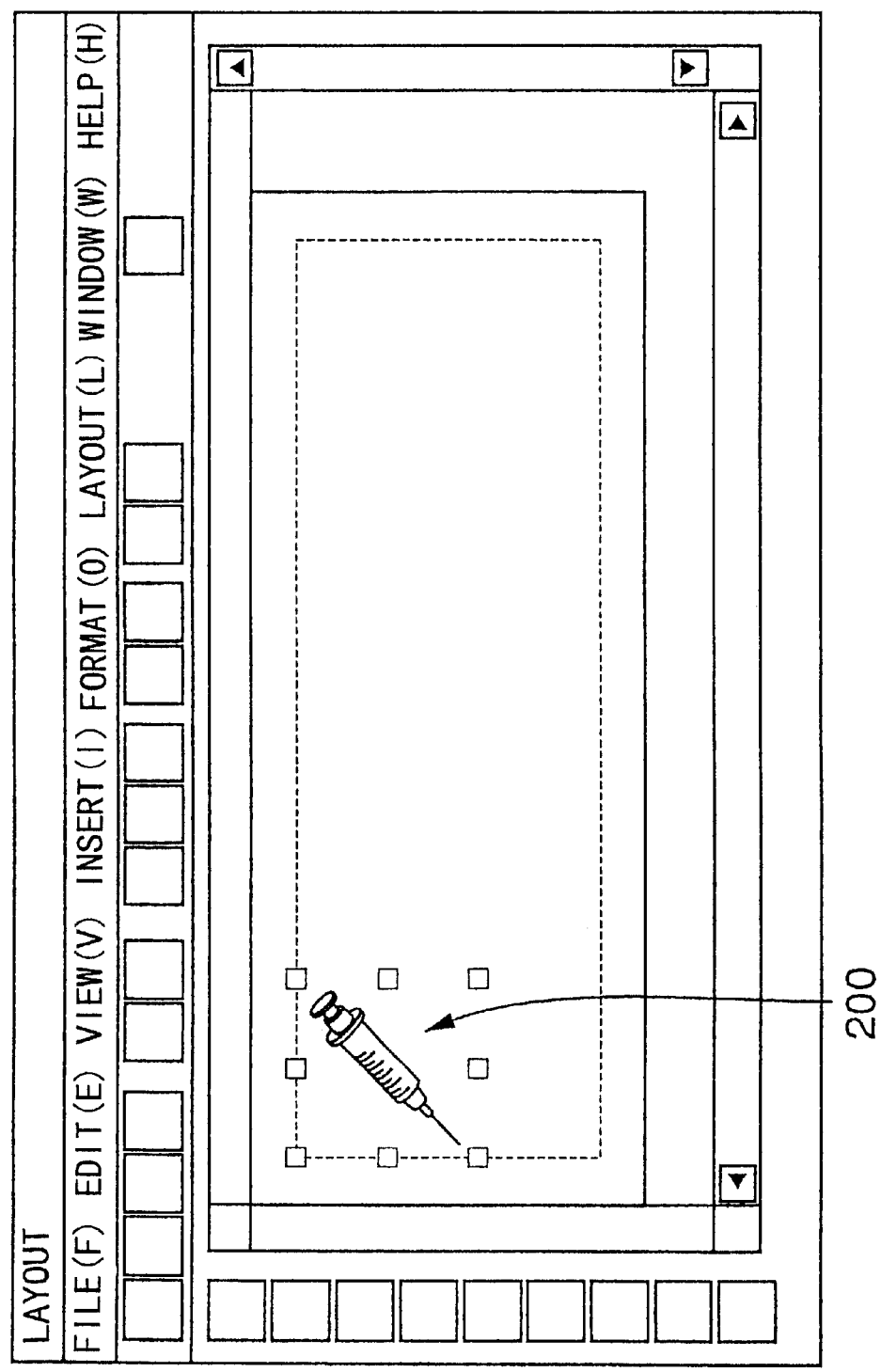
FIG. 18 schematically shows a display indicating the image that corresponds to selected image data, when the clip art data processing program is executed by the computer according to the invention.

In steps S31 to S33 in the flowchart of FIG. 13, a plurality of image data in the clip art 141 is displayed on the CRTD 96, and one of the image data can be selected by an operator. Images 200 to 204, which are represented by the image data in the clip art 141, are displayed as shown in FIG. 17, when selecting "Clip Art" on the display shown in FIG. 6, or when selecting "Insert (I)" "Clip Art (C)" as shown in FIG. 16. If the image 200 is selected, the image 200 is displayed on the CRTD 96 (FIG. 18), thereby the image object is created. The clip art can be selected by operation of the mouse 20, or the keyboard 18 (Alt+I,C, as shown in FIG. 16).

Figure 19A:
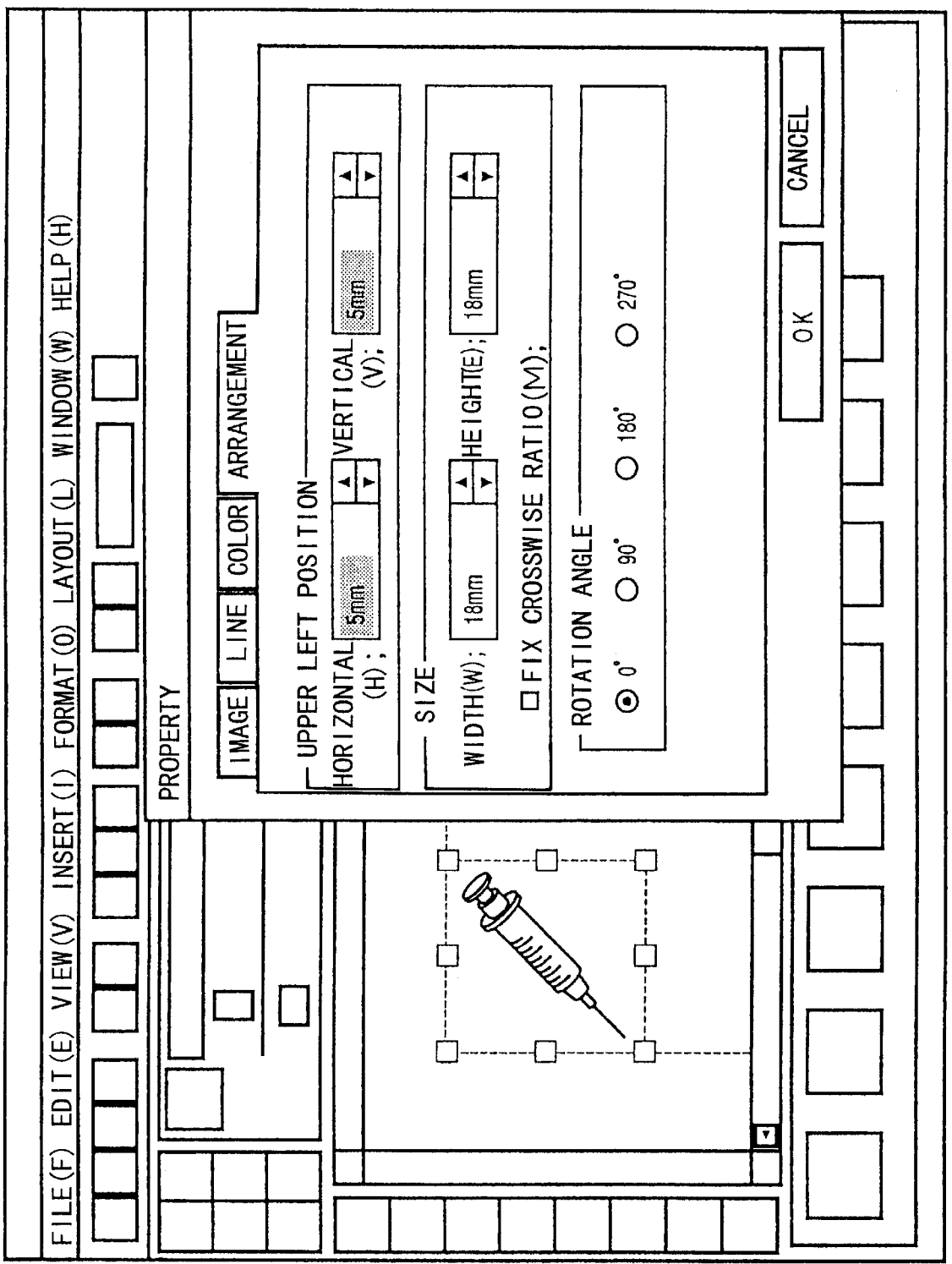
FIGS. 19A and 19B schematically show a display where the attribute of the selected image data can be set thereon according to the invention.
Figure 19B:
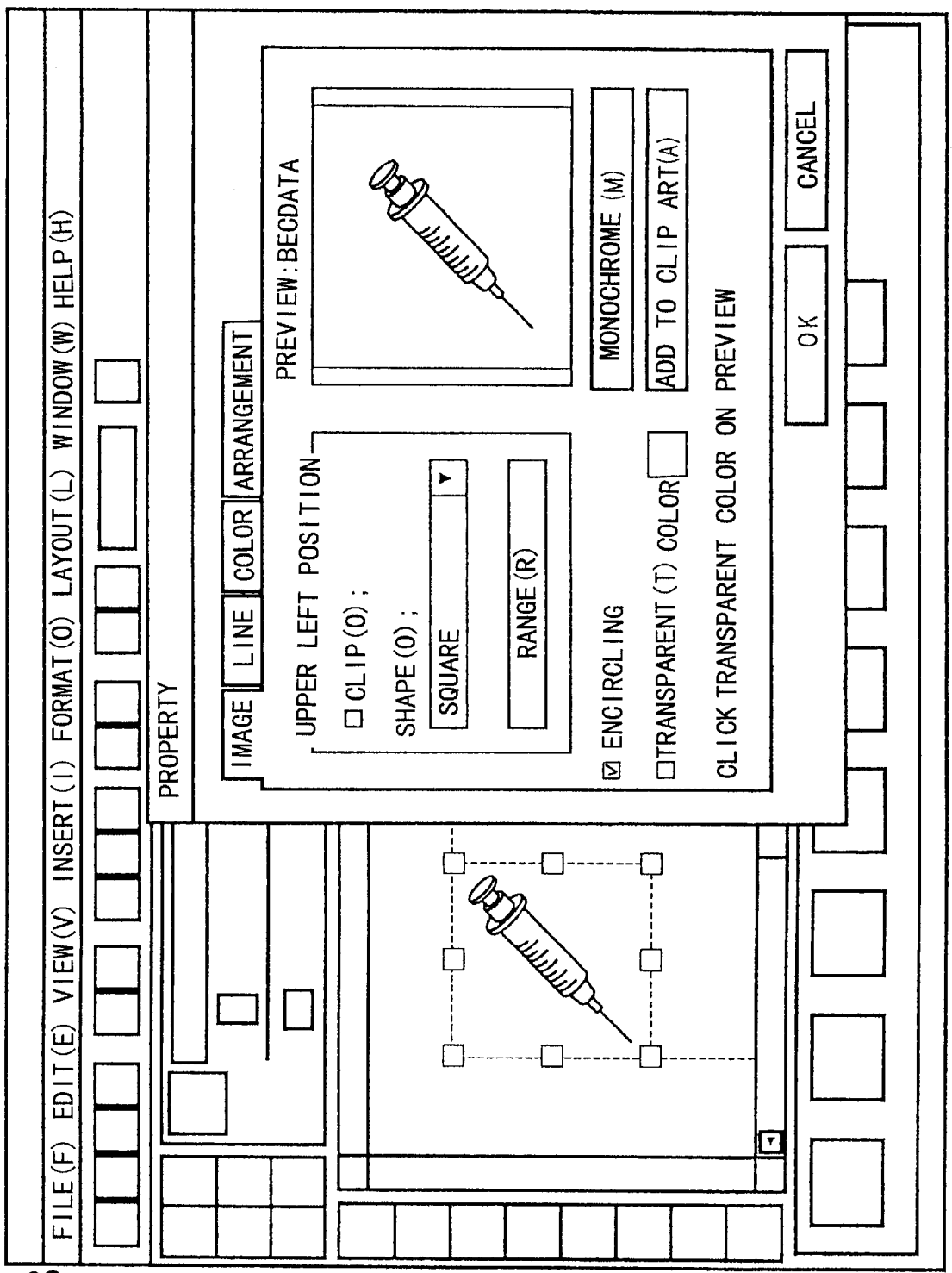

When the desired image data is selected, an image flag is set in order to show that the image data has been selected from the clip art 141. The image flag may be referred to as a selection method flag or a generation method flag, as it indicates that the image has been created with the image itself, which is selected from the image data in the clip art 141. The attribute (such as size, ratio of the length and breadth, rotation angle, trimming, framing and coloring process (FIGS. 19A and 19B)) of the selected image data is set in step S35 by right-clicking on the selected image, and then clicking "Image" "Property". At the same time, the image 200 is changed according to the set attribute. The selected image is stored in the image data memory 115 of the RAM 90, wherein the image is expanded horizontally (described later).

Figure 14:
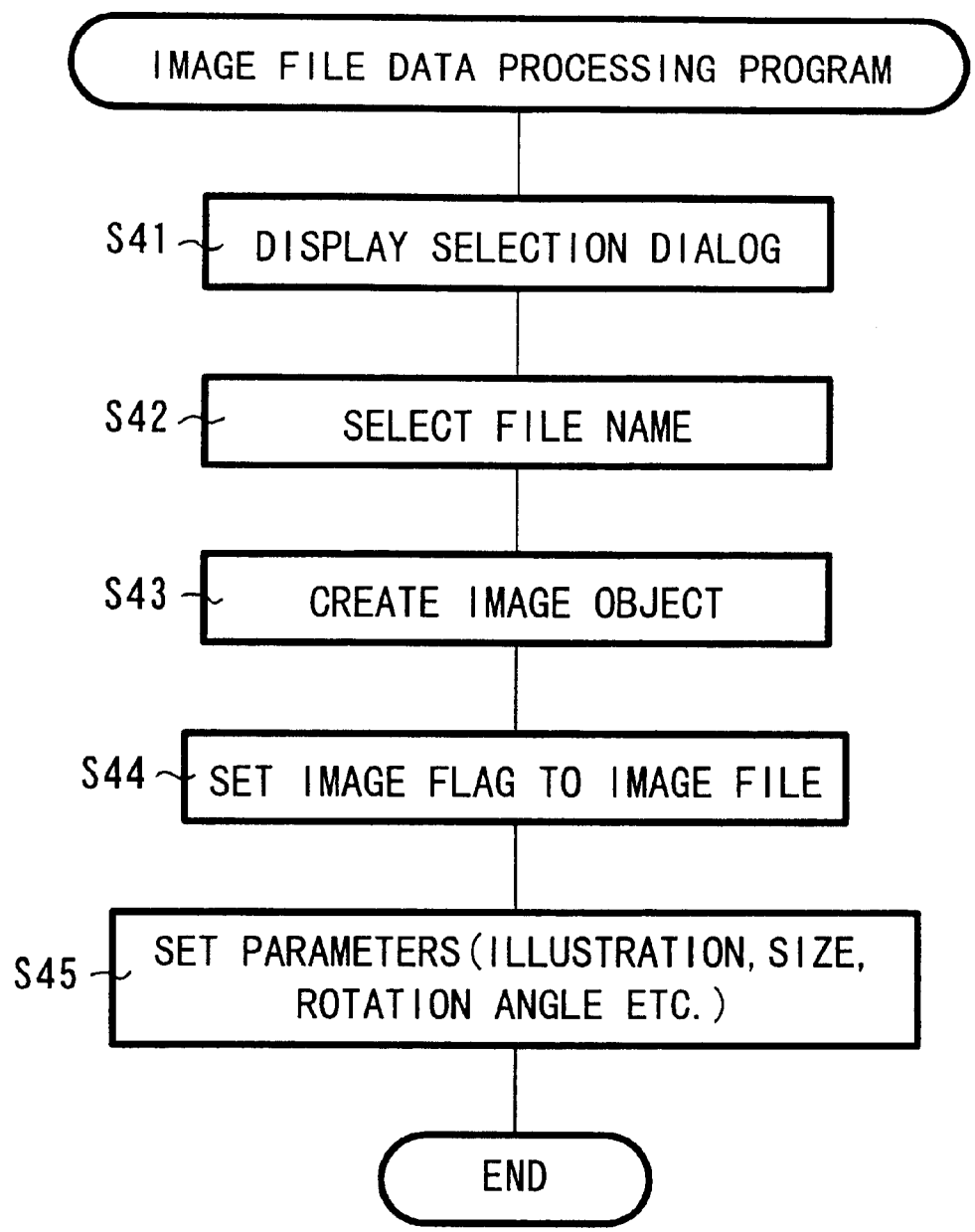
FIG. 14 is a schematic flowchart showing a image file data processing program stored in the memory medium according to a preferred embodiment of the invention.

Similarly, the image file data processing program is executed by selecting "Image File". A plurality of image data names are retrieved from the image file memory 125, and a list of the names is displayed on the CRTD 96 in steps S41 to S45 of the flowchart of FIG. 14. If the image 201 is selected, it is displayed on the CRTD 96 corresponding to its image data name in the list. An image kind flag (a selection method flag, a generation method flag) is set and indicates that the selected data is created with the data from the image file. If it is necessary, the attribute can be set against the selected image.

Figure 20:
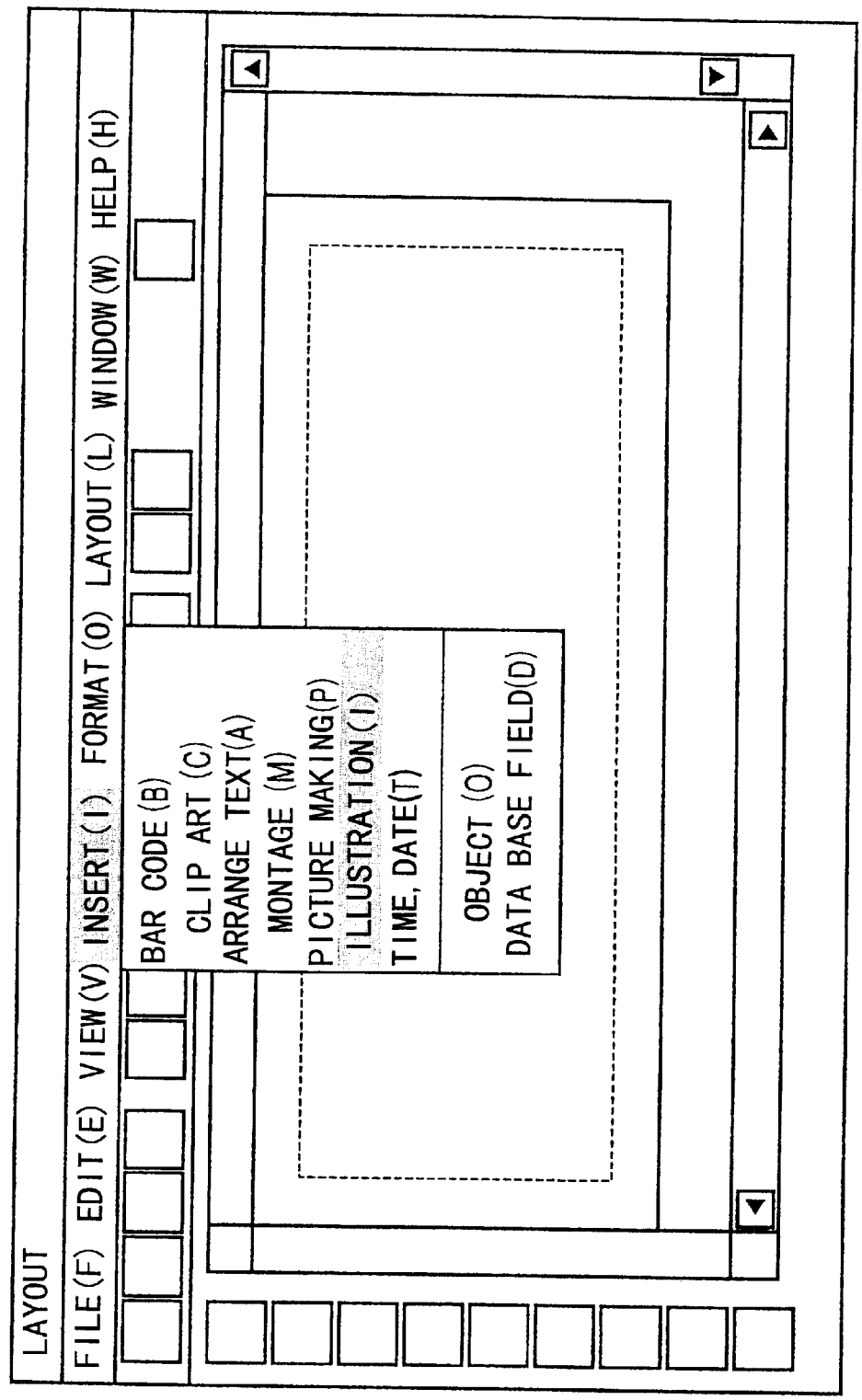
FIG. 20 schematically shows a display where image data is being created by an operator, using a plurality of image data in the image file according to the invention.
Figure 21:
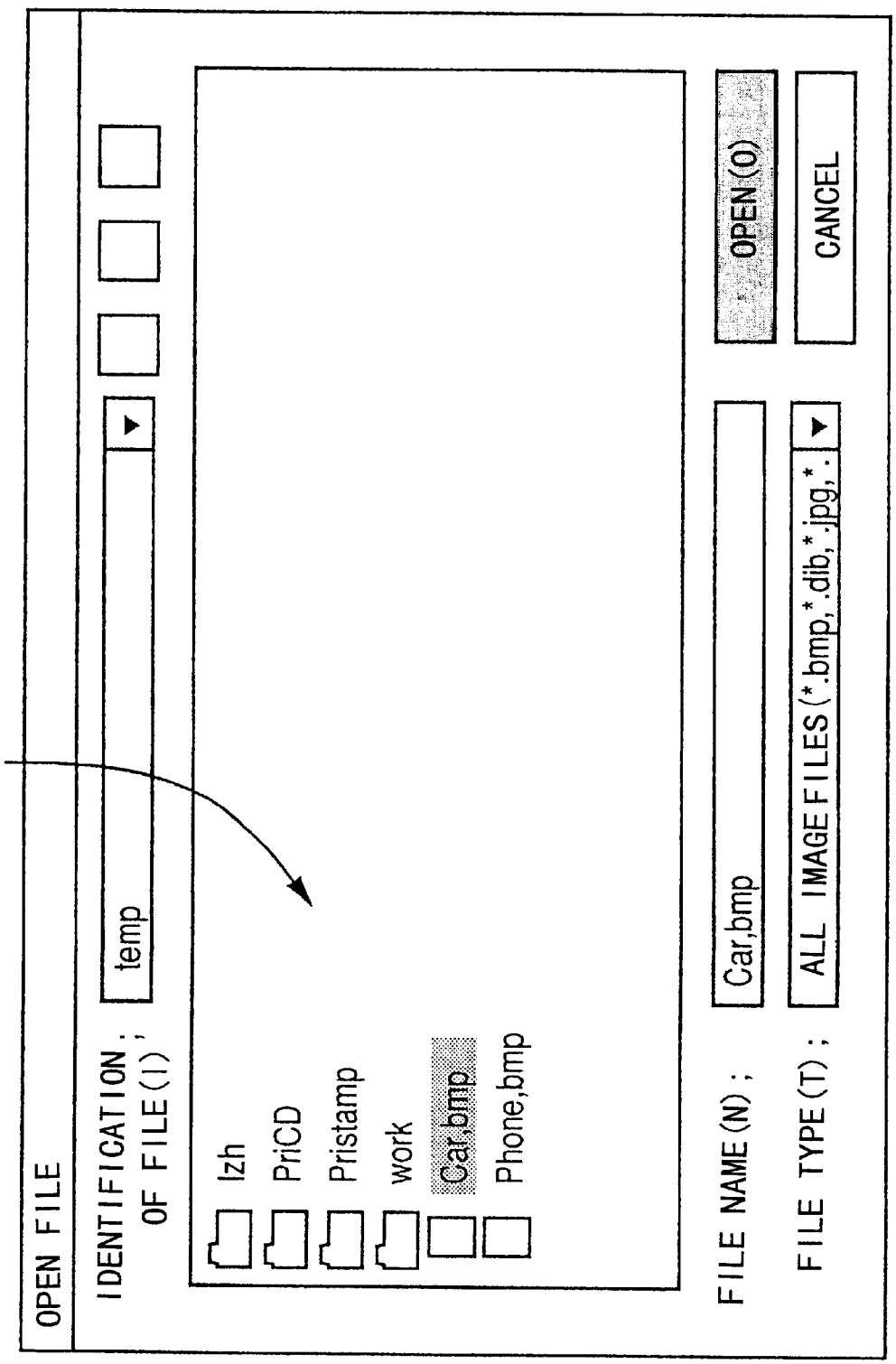
FIG. 21 schematically shows a CRTD where one of image data in the image file can be selected, when the image file data processing program is executed by the computer according to the invention.
Figure 22:
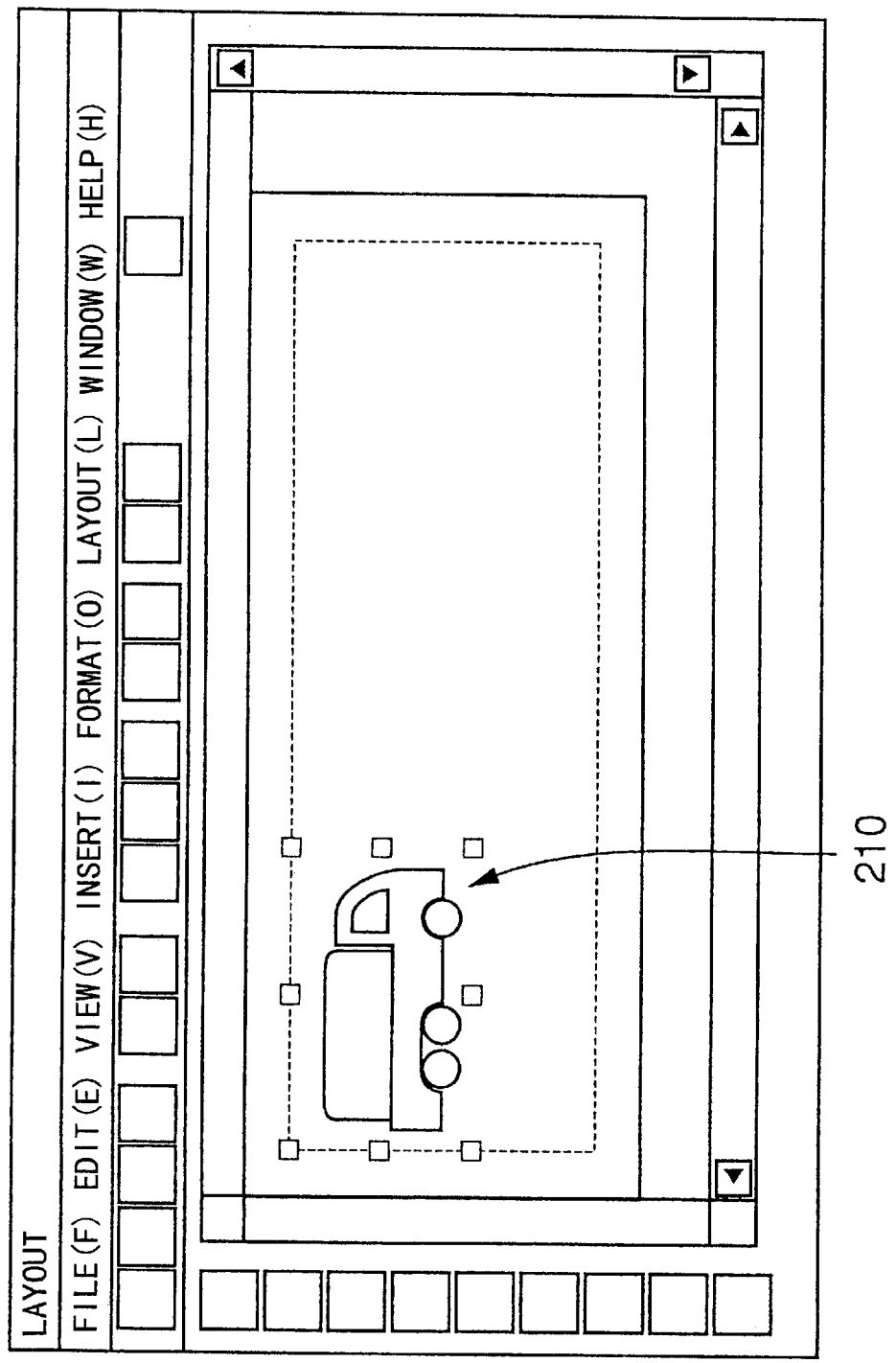
FIG. 22 schematically shows a display indicating the image that corresponds to selected image data, when the image file data processing program is executed by the computer according to the invention.

A file name list 212 in the image file 125 is displayed, as shown in FIG. 21, when selecting "Figure" on the display shown in FIG. 6, or when selecting "Insert (I)" "Illustration (I)" as shown in FIG. 20, and after that opening the "temp" file. When selecting one of the image data names in the list 212, the image 210, which corresponds to the selected name, is displayed with its attribute, as shown in FIG. 22. Here, the rotation angle is set to 90 degrees (described later).

In the case of modifying an image (first image) with another image (second image), the image data modification program is executed by specifying the first image and commanding its modification. The group to which the first image belongs (its memory means) is searched, and then, the condition is set so that the second image data in the group can be selected. An operator does not need to delete the first image, and repeat the same operation on the displays shown in FIG. 16, or on the display shown in FIGS. 20 and 21.

Figure 15:
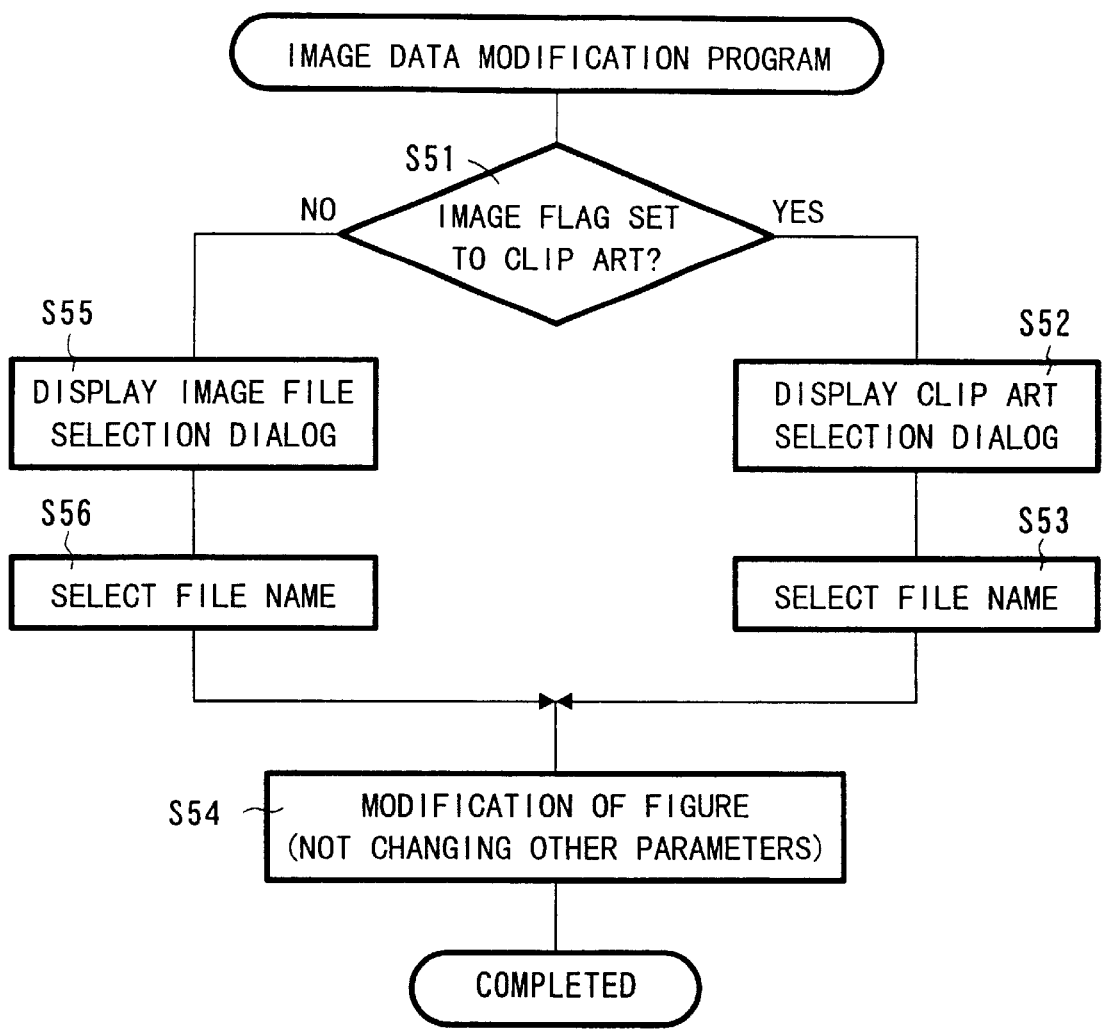
FIG. 15 is a schematic flowchart showing a image data modification program stored in the memory medium according to a preferred embodiment of the invention.
Figure 23:
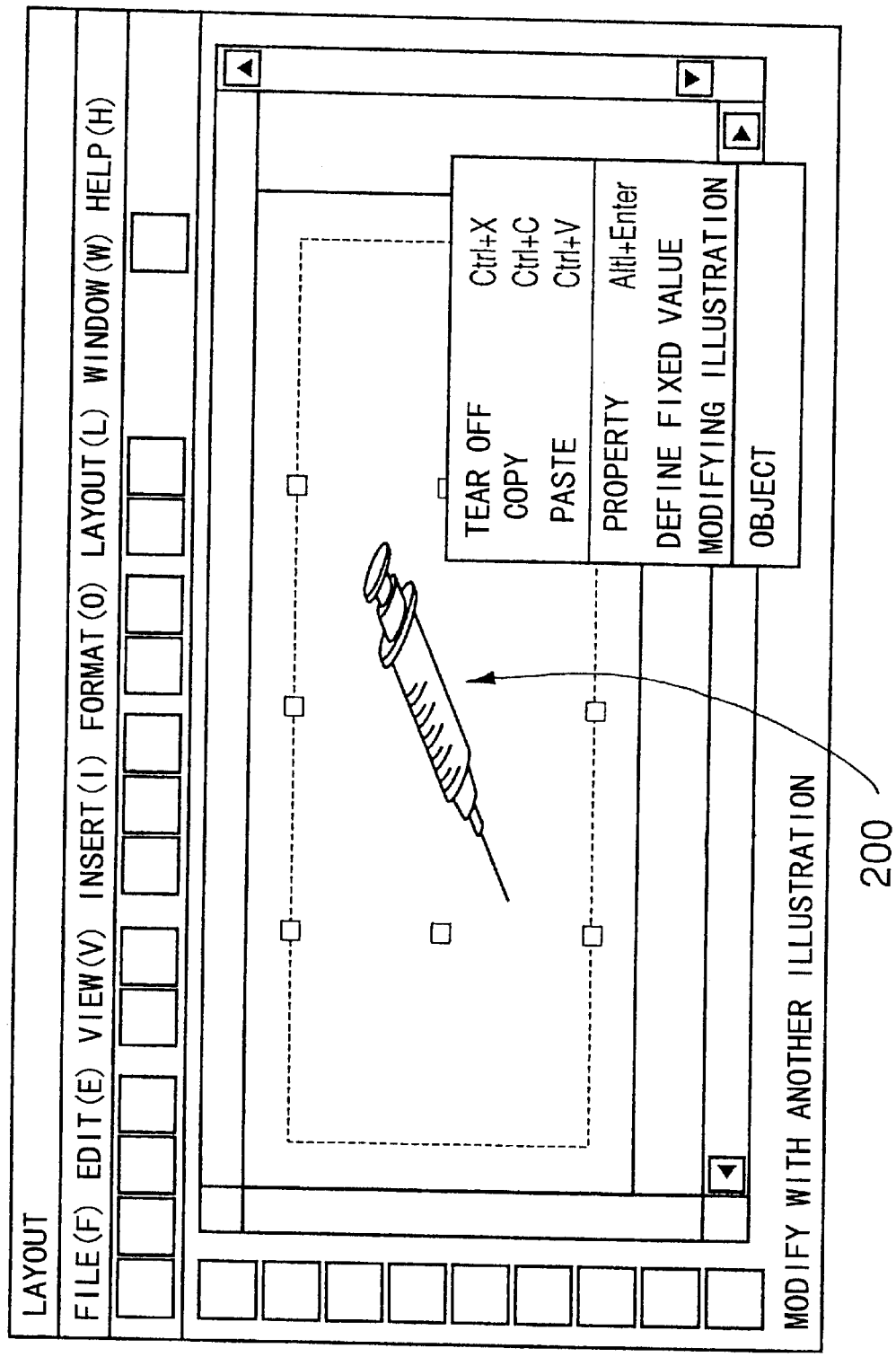
FIG. 23 schematically shows a display where an operator commands the modification of the selected image data according to the invention.
Figure 24:
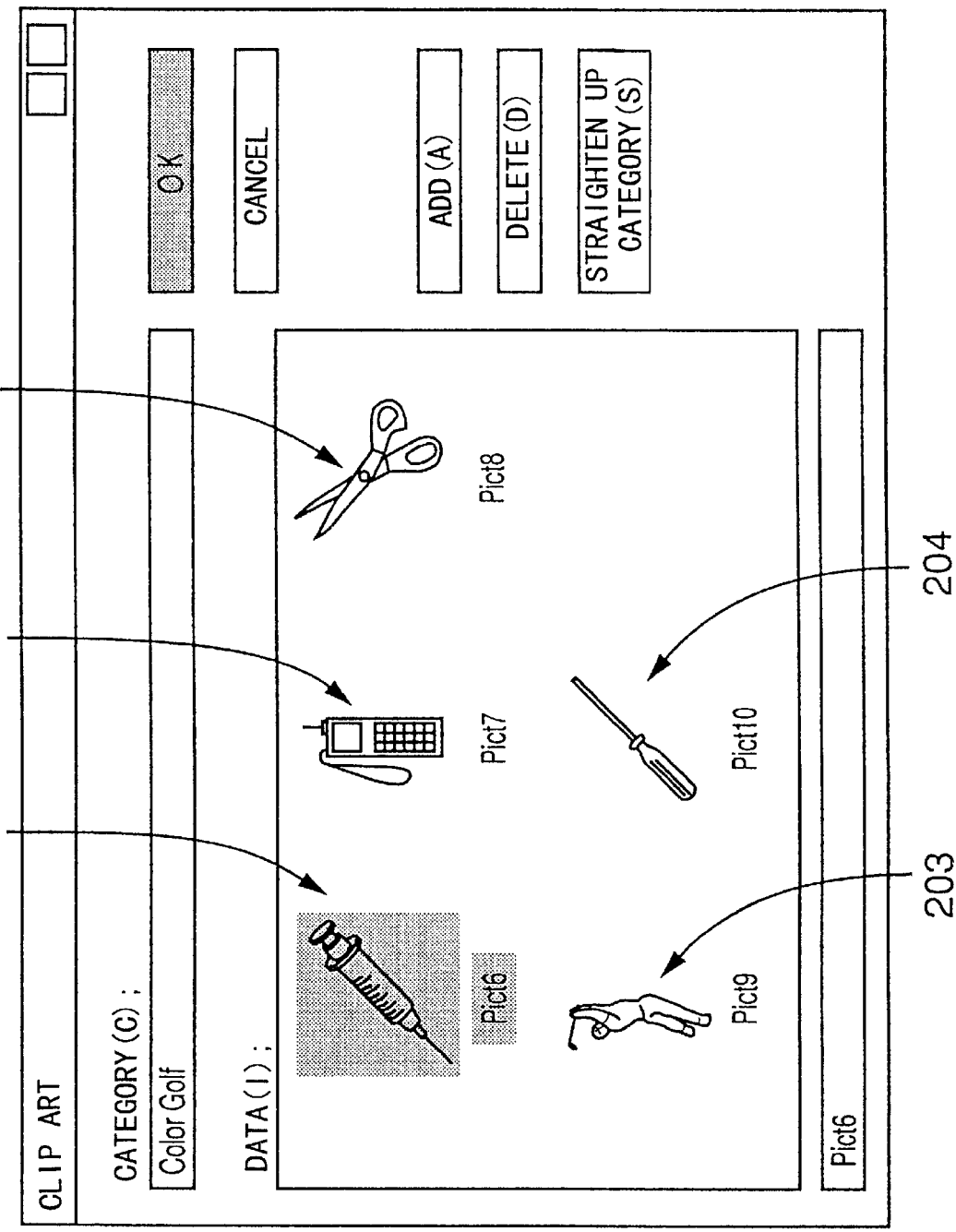
FIG. 24 schematically shows a CRTD where one of image data in the clip art can be selected thereon, when the image data modification program is executed by the computer according to the invention.
Figure 25:
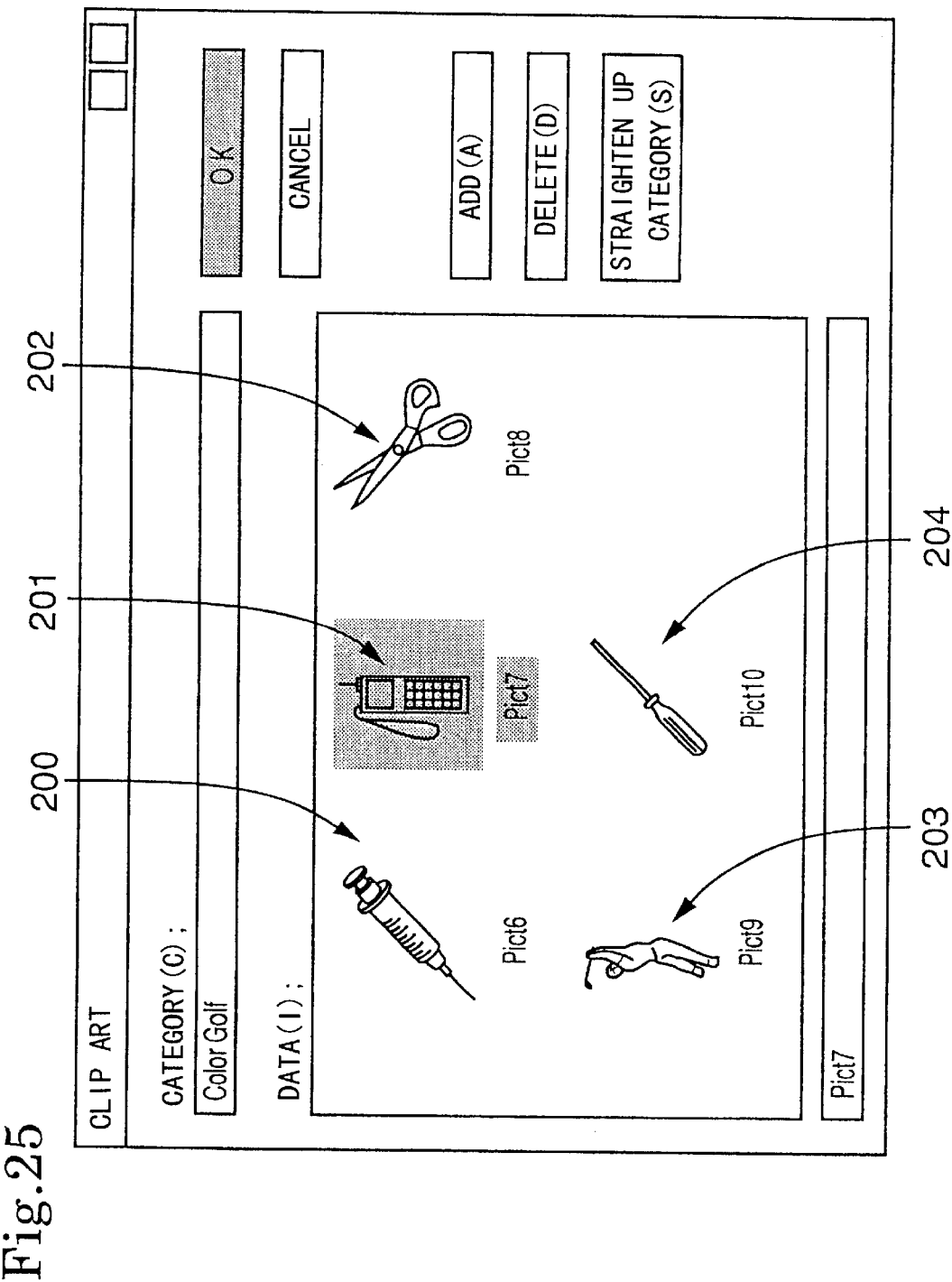
FIG. 25 schematically shows a display of another image data selected by an operator according to the invention.
Figure 26:
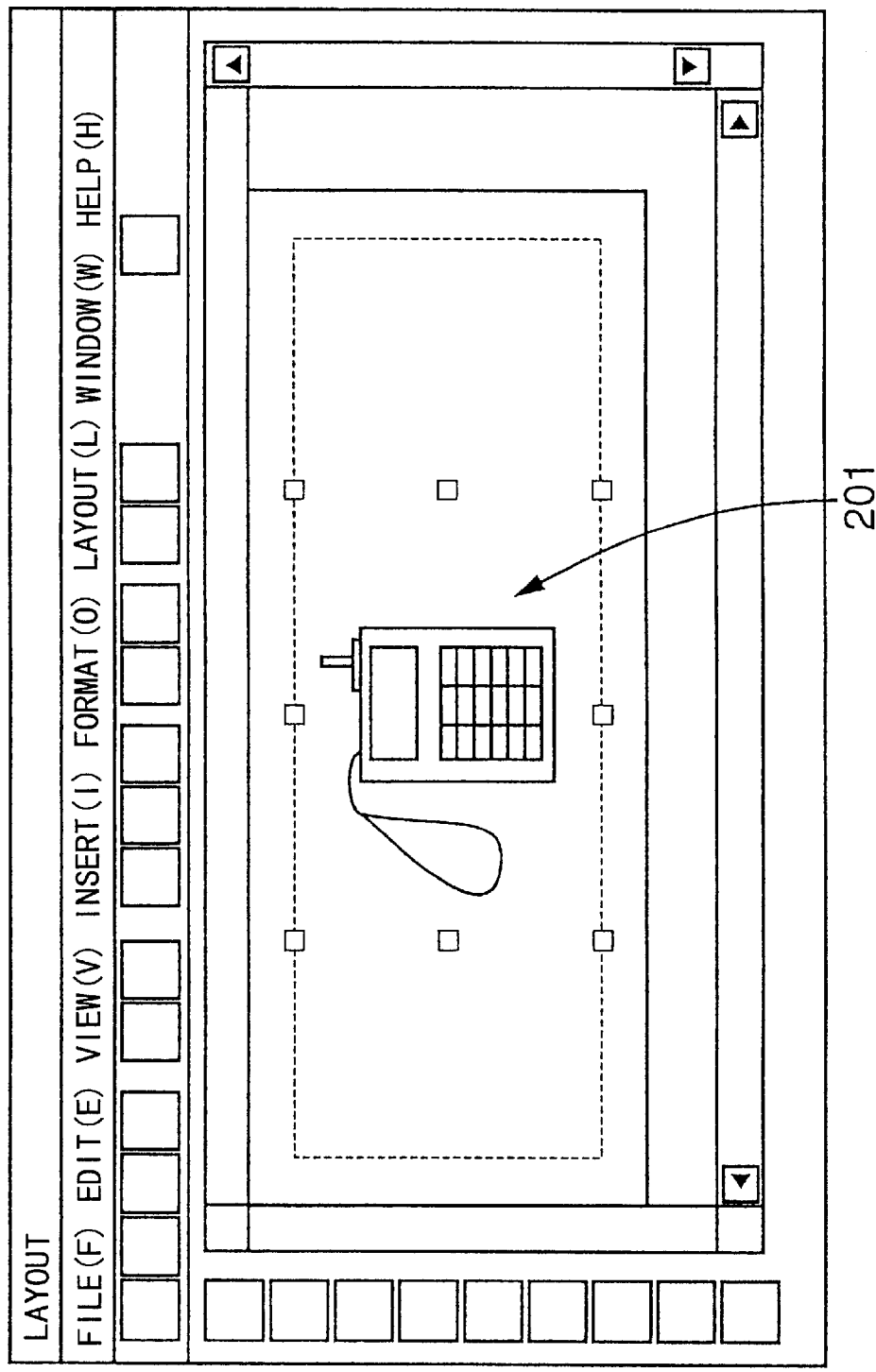
FIG. 26 schematically shows a display indicating the image that corresponds to modified image data, after the image data modification program is executed by the computer according to the invention.

The image 200 (which is the first image) can be modified by clicking thereon and selecting "Modifying Illustration" on the display shown in FIG. 23. In step S51 of the flowchart of FIG. 15, it is judged whether or not the image kind flag of the image data 200 indicates the clip art 141. Then, the images 200 to 204 in the clip art 141 are retrieved and displayed as shown in FIG. 24 in step S52. An operator can select one of the images (as the second image) with operation of the mouse 20, thereby the image data is modified in step S54. The image data that has been stored in the image data memory 115 is replaced with the newly selected image data. For example, if the image 201 is newly selected, the image 200 is replaced with the image 201 as shown in FIGS. 25 and 26. The image 201 is horizontally expanded, as the attribute of the image 200 is maintained. The modified image data is converted into dot data, stored in the dot data memory 111, and is then sent to the printer 12.

Figure 27:
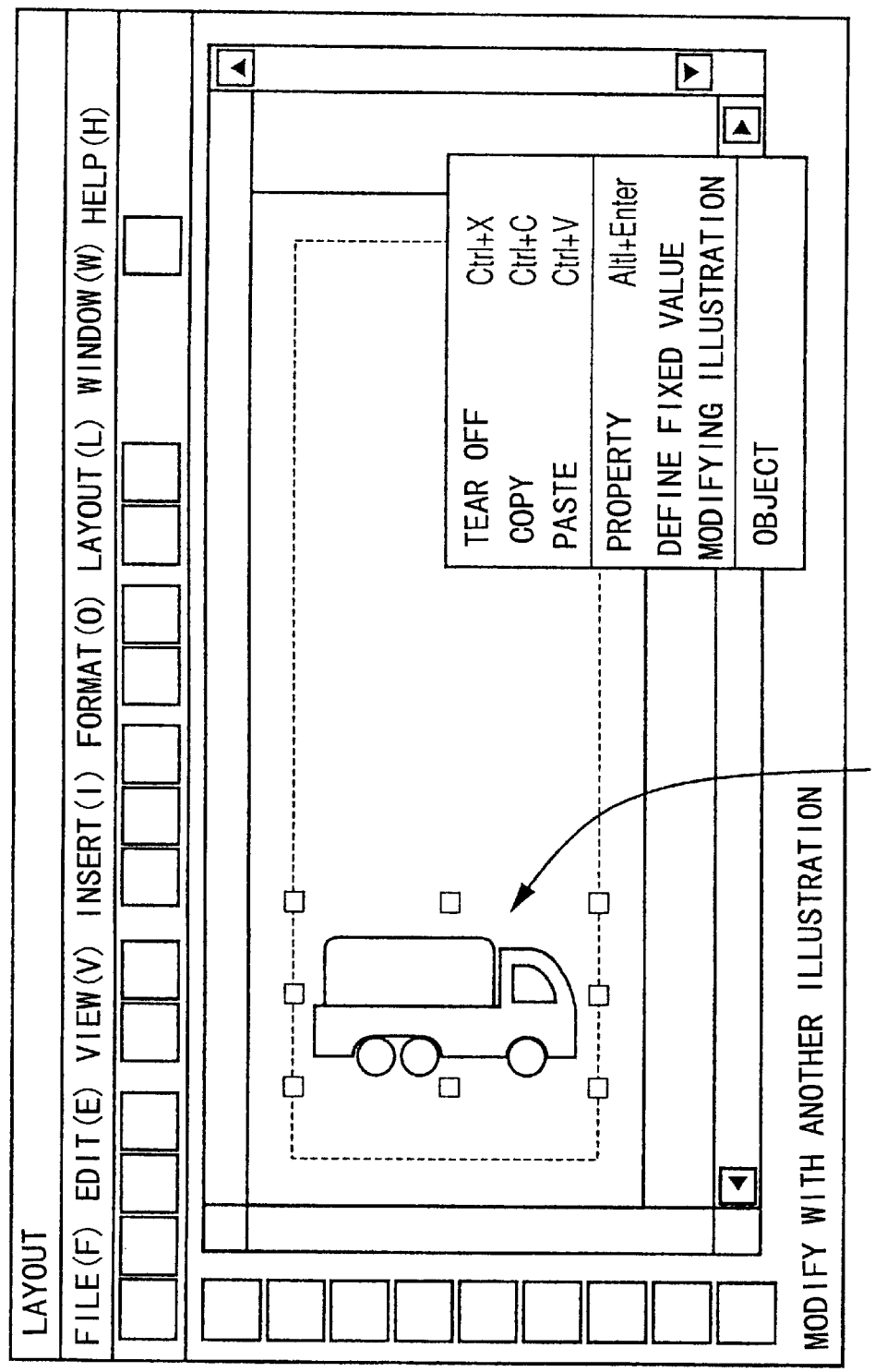
FIG. 27 schematically shows a display where an operator commands the modification of selected image data according to the invention.
Figure 28:
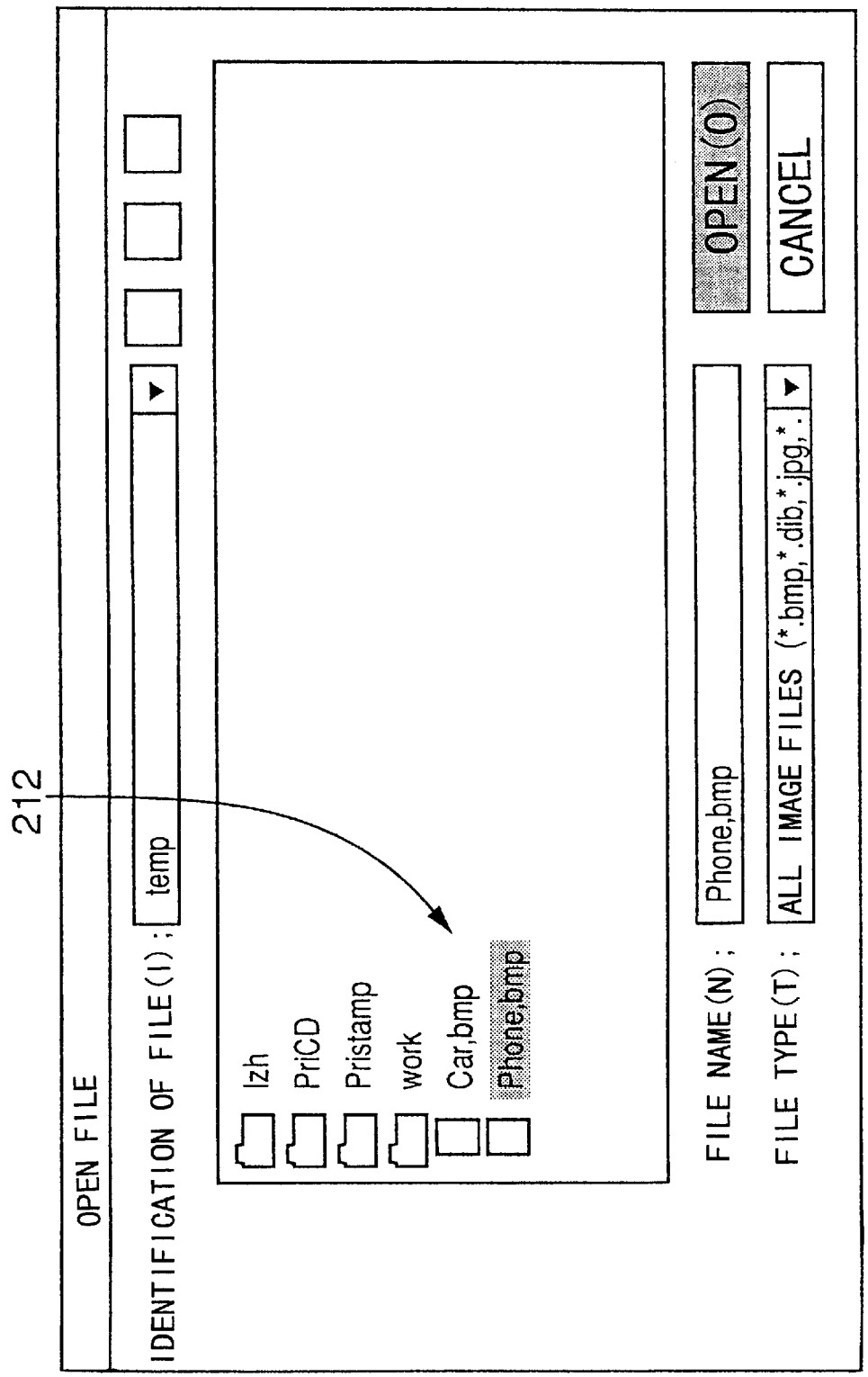
FIG. 28 schematically shows a display where one of the image data in the image file can be selected thereon, when the image data modification program is executed by the computer according to the invention.
Figure 29:
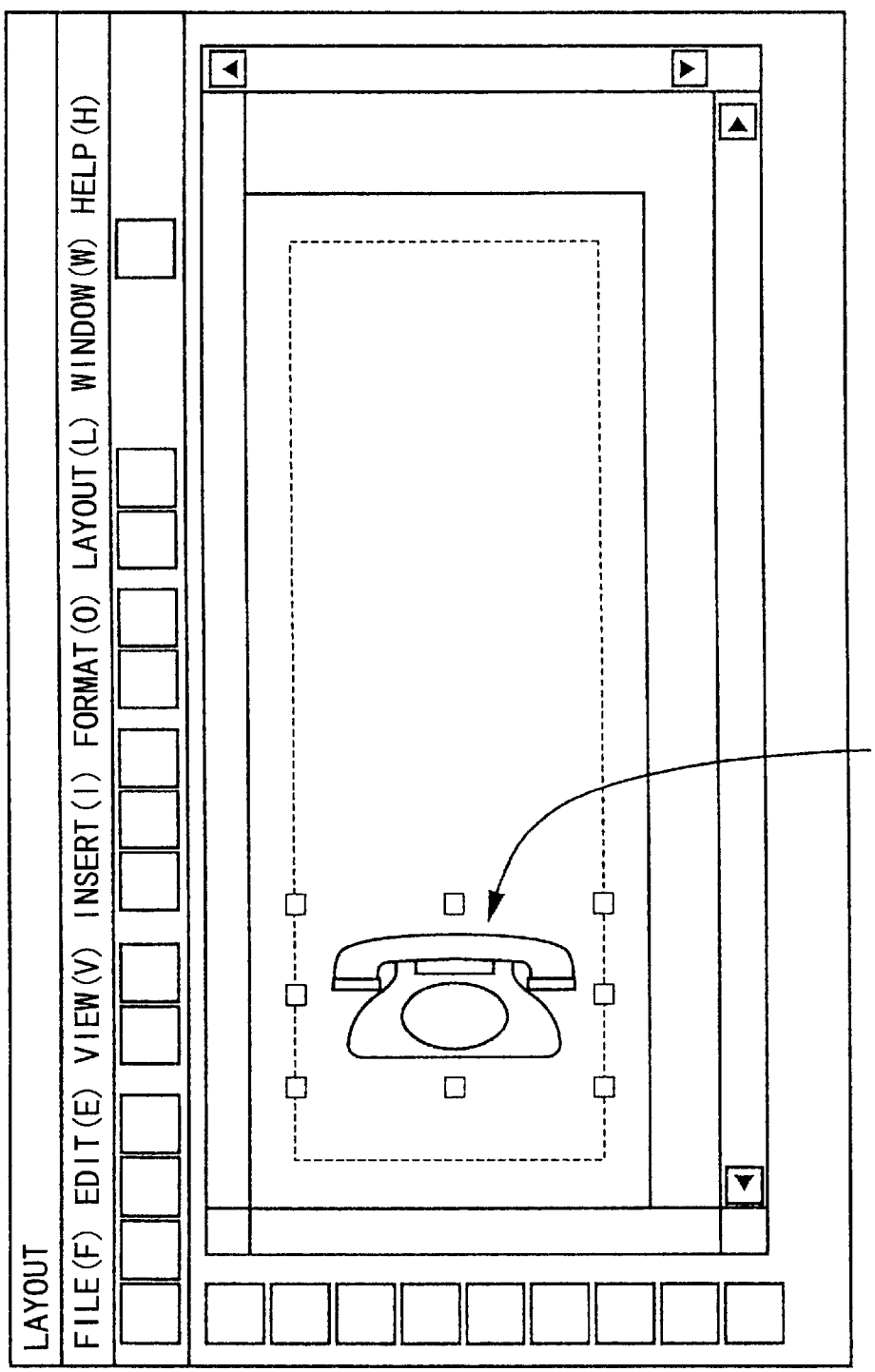
FIG. 29 schematically shows a display indicating the image that corresponds to modified image data, after the image data modification program is executed by the computer according to the invention.

The image 210 can be modified with the other image data in the image file 125 in the same way. As shown in FIG. 27, when right-clicking on the image 210, and then selecting "Modifying Illustration", the computer judges "No" in step S51 and executes steps S55, S56 and S54, as the image kind flag shows that the selected image is created with the data in the image file 125. The file name list is displayed as shown in FIG. 28, and one of the image data names can be newly selected in this condition. If "Phone, bmp" is selected, the image 210 is replaced with the image 214, which corresponds to "Phone, bmp", and is displayed as shown in FIG. 29. The image 214 is rotated by 90 degrees, as the attribute of the image 210 is also maintained.

In this way, in the case of modifying the image data (which represents the first image) with the other data in the same memory means (which represents the second image), the condition is displayed, wherein the second image can be newly selected when specifying the first image and commanding its modification. An operator can newly select the image data without repeating the same operation to set the condition.

Further, the attribute can be set by clicking the first image itself. The attribute of the first image is maintained before and after its modification. Therefore, an operator does not need to set the same attribute repeatedly. In other words, the operator does not recognize the memory means that stores the image data and the contents of its attribute in order to set the attribute against the second data.

Heretofore, the selected image data in the image file 125 can not be replaced with the other data, although the image data in the clip art 141 can be replaced. An operator has to delete the first image, set the condition where the second image is newly selected, and then select the second image in order to modify the image data in the image file 125 using the conventional method. However, the selected image data in the image file 125 can be easily modified, as the selected data is replaced with the other data according to the present invention.

As described above, in the present embodiment, each of image data storing means respectively preferably comprises the image file 125 in the hard disk 102 or the clip art 141 in the CDROM 99. The image data selecting means preferably comprises the mouse 20, which is also an image data modification means. Further, a selection dialog setting means preferably comprises the image data modification program 150 of the CDROM 99 and the portion of the CPU 89 which executes steps S52 and S55. An image data replacing means preferably comprises the portion of the CPU 89 that executes step S54.

Execution of step S51 corresponds to a flag judging process, and execution of steps S52 and S55 corresponds to a selection dialog setting process. Execution of step S54 corresponds to a replacing process, which is also an attribute-maintained replacing process. Also, execution of step S55 corresponds to an image data names displaying process, execution of step S54 corresponds to an image data replacing process.

The hard disk 102 can be referred to as a memory medium in the present invention, as the programs in the CDROM 99 are stored in the hard disk 102. The programs in the hard disk are retrieved by the HD drive device 94, and executed by the CPU 89.

The image file 125 and the clip art 141 can be both stored in the CDROM 112, or in the hard disk 102. Contrary to the embodiment described above, the clip art 141 can be stored in the hard disk 102 and the image file 125 can be stored in CDROM 99. Moreover, an image data storing means may be provided in addition to the image file 125 and the clip art 141.

Further, as mentioned above, the clip art 141 is stored in the CDROM 99, and the image file 125 is stored in the hard disk 102 in the preferred embodiment of the invention. However, both of the clip art 141 and the image file 125 are not necessarily stored, only the image file 125 may be stored. Even if the clip art 141 is not stored, image data can be modified with the other image data in the image file 125, according to the image data modification program.

Figure 32:
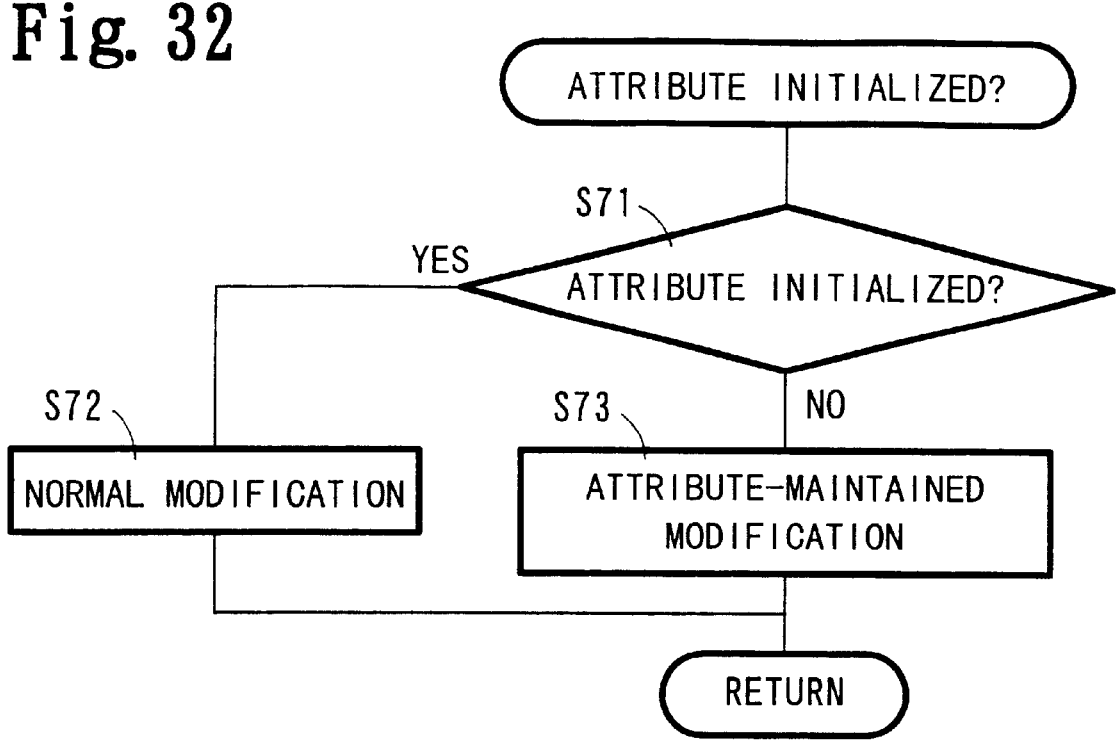
FIG. 32 is a schematic flowchart showing an attribute-maintained image data modification program stored in a different memory medium from the memory medium according to a preferred embodiment of the invention.

The CDROM 99 may store an attribute-maintained image data modification program, as shown in the flowchart of FIG. 32. This program is executed, for example, when an operator commands the modification of at least one of the images 200 or 210. As described above, in the case of modifying the image, it is judged whether or not the attribute is initialized in step S71. If it is initialized ("Yes" in step S71), the image is modified in a normal way in step S72. If the attribute is set ("No" in step S71), the image is modified so that the attribute is maintained. The image can be modified with the other image data that belongs to the same group as the original image, or to the other group. Further, it may be modified after setting the condition wherein the image can be selected, or may be modified automatically.

In the embodiment mentioned above, the CDROM 99 is used as a memory medium. However, a floppy disk (not shown), etc. may be used as a memory medium. The programs and the like in the floppy disk are retrieved by the FD drive device 96 and executed by the CPU 89.

If a memory medium is writable, the memory medium can store the character data memory 110, the dot data memory 111, select image data memory 115, the select template memory 116, and the output template memory 117 and the like as well as the programs. A compact disk (CDRAM), which is optically writable, may also be used as a memory medium. In other words, it is possible to use a memory medium that is, or is not writable. Also, the memory medium may be attached to the computer 10 permanently, or may be removable.

Further, a sheet printer, which prints output images on paper sheets, may be used as an output device instead of the tape printer 12.

The tape printer 12 is connected to the computer 10 in the embodiment mentioned above. However, the tape printer 12 is not necessarily connected to the computer 10 in order to create output image data, if the tape printer 12 has a control portion that can retrieve programs from the memory medium and execute these programs. In such a case, the print portion consists of the thermal head 50, the platen roller 52 and the tape spool 34, etc. Even if the tape printer 12 does not have the control portion, but is connected to the computer having the memory medium, an output image can be stored.

While the invention has been described in detail with reference to a specific embodiment thereof, it would be apparent to those skilled in the art that various changes and modifications may be made therein without departing from the spirit of the invention.

What is claimed is:

1. A memory medium for storing a program used for generating image data, the program comprising:

a position data retrieval program that retrieves position data corresponding to a predetermined output format;

an object image data retrieval program that retrieves object image data corresponding to an object image which is formed regardless of the predetermined output format;

an identification program that identifies whether the object image data has an identification corresponding to the position data; and an arrangement program that arranges the object image data based on the position data if said identification program identifies that the object image data has an identification corresponding to the position data, wherein said object image data includes an object character train data corresponding to an object character train which is formed by operator character data input without regard to the predetermined output format.

2. The memory medium according to claim 1, wherein the position data includes a replaceable image data corresponding to a replaceable image which is formed based on the predetermined output format; and said arrangement program includes a replacement program that replaces the replaceable image data with the object image data if said identification program identifies that the object image data has the identification corresponding to the replaceable image data.

3. The memory medium according to claim 2, wherein said identification program includes a determination program that determines the identification of at least one of the replaceable image data and the object image data.

4. The memory medium according to claim 3, wherein said determination program determines the identification by choosing predetermined data from the at least one of the replaceable image data and the object image data of which identification is to be determined by said determination programs; and said identification program identifies whether the object image data has a same identification as the replaceable image data has.

5. The memory medium according to claim 3, wherein said determination program executes the determination if no identification is included in the at least one of the replaceable image data and the object image data.

6. The memory medium according to claim 2, wherein the identification includes attribute data included in the replaceable image data and the object image data; and said identification program executes identification based on the identification as attribute data of the replaceable image data and the object image data.

7. The memory medium according to claim 6, further stores a provision program that provides at least one of the replaceable image data and the object image data with the identification as attribute data.

8. The memory medium according to claim 2, wherein said replacement program includes an assignment program that assigns a maximum area to the object image based on the identification of the replaceable image data, the maximum area being available for outputting the object image.

9. The memory medium according to claim 8, wherein said replacement program executes the replacement by arranging the object image data to cover all of the maximum area.

10. The memory medium according to claim 2, wherein said identification program identifies that the object image data has the identification corresponding to the replaceable image data if both of the object image data and the replaceable image data have a common feature.

11. The memory medium according to claim 10, wherein the common feature includes one of an identification, a data source and a data layout.

12. The memory medium according to claim 1, wherein said object image data retrieval program retrieves a plurality of object image data corresponding to a plurality of object images which are formed regardless of the predetermined output format; said identification program includes a search program that searches from the plurality of object image data the object image data which has the identification corresponding to the position data; and said arrangement program, based on the position data, arranges the object image data searched in the search by said searching program.

13. The memory medium according to claim 12, wherein said position data retrieval program retrieves a plurality of position data corresponding to a predetermined output format object image data; and said search program executes a plurality of searches corresponding to the plurality of position data.

14. The memory medium according to claim 2, wherein said object image data includes an object character train data corresponding to an object character train which is formed regardless of the predetermined output format; said replaceable image data includes a replaceable character train data corresponding to a replaceable character train which is formed based on the predetermined output format; and said replacement program replaces the replaceable character train data with the object character train data if said identification program identifies that the object character train data has the identification corresponding to the replaceable character train data.

15. The memory medium according to claim 14, wherein said replaceable character train data retrieval program retrieves a plurality of replaceable character train data corresponding to a plurality of replaceable character trains which are formed based on the predetermined output format; said object character train data retrieval program retrieves a plurality of object character train data corresponding to a plurality of object character trains which are formed regardless of the predetermined output format; and said replacement program executes a plurality of replacements corresponding to the plurality of replaceable character train data.

16. An image data generating apparatus comprising:

a position data retrieval unit that retrieves position data corresponding to a predetermined output format;

an object image data retrieval unit that retrieves object image data corresponding to an object image which is formed regardless of the predetermined output format;

an identification unit that identifies whether the object image data has an identification corresponding to the position data; and an arrangement unit that arranges the object image data based on the position data if said identification unit identifies that the object image data has the identification corresponding to the position data, wherein said object image data includes an object character train data corresponding to an object character train which is formed by operator character data input without regard to the predetermined output format.

17. An image recording apparatus recording an image on a recording medium according to image data comprising:

a position data retrieval unit that retrieves position data corresponding to a predetermined output format;

an object image data retrieval unit that retrieves object image data corresponding to an object image which is formed regardless of the predetermined output format;

an identification unit that identifies whether the object image data has an identification corresponding to the position data;

an arrangement unit that arranges the object image data based on the position data if said identification unit identifies that the object image data has the identification corresponding to the position data; and a recording unit that records the object image data arranged by said arrangement unit on a recording medium, wherein said object image data includes an object character train data corresponding to an object character train which is formed by operator character data input without regard to the predetermined output format.

* * * * *